(12) United States Patent
Noguchi

(10) Patent No.: US 10,425,019 B2
(45) Date of Patent: Sep. 24, 2019

(54) MOTOR AND APPARATUS USING THE SAME

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/496,590

(22) Filed: Apr. 25, 2017

(65) Prior Publication Data
US 2017/0317612 A1 Nov. 2, 2017

(30) Foreign Application Priority Data

Apr. 28, 2016 (JP) .................................. 2016-091507

(51) Int. Cl.
G02B 27/00 (2006.01)
H02N 2/02 (2006.01)
H02N 2/10 (2006.01)
G02B 7/04 (2006.01)
G02B 7/08 (2006.01)

(52) U.S. Cl.
CPC ............. *H02N 2/026* (2013.01); *H02N 2/103* (2013.01); *G02B 7/04* (2013.01); *G02B 7/08* (2013.01)

(58) Field of Classification Search
CPC .................................................... H02N 2/026
See application file for complete search history.

(56) References Cited

U.S. PATENT DOCUMENTS

| 6,211,603 | B1 | 4/2001 | Iino et al. |
| 9,091,805 | B2 | 7/2015 | Yamasaki et al. |
| 2009/0009029 | A1 | 1/2009 | Sakamoto |

(Continued)

FOREIGN PATENT DOCUMENTS

| CN | 102916609 A | 2/2013 |
| CN | 104104265 A | 10/2014 |

(Continued)

OTHER PUBLICATIONS

EESR issued in Great Britain Appln. No. 1706540.0 dated Oct. 26, 2017.

(Continued)

*Primary Examiner* — James C. Jones
(74) *Attorney, Agent, or Firm* — Rossi, Kimms & McDowell LLP

(57) ABSTRACT

A motor includes a first vibrator, a plurality of biasing parts that are disposed around the first vibrator and that presses the first vibrator onto a contacting member in contact with the first vibrator, a first pressing member that is biased by the plurality of biasing parts and that includes a pressing part pressing the first vibrator by biasing force of the plurality of biasing parts, and a second pressing member that is biased by the plurality of biasing parts. The first vibrator and the contacting member move relatively by vibrations that occur in the first vibrator. The first and second pressing members integrally moves while the first vibrator moves. The first pressing member and the first vibrator are tiltable around a first direction orthogonal to both of a moving direction of the first vibrator and a biasing direction of the plurality of biasing parts.

29 Claims, 23 Drawing Sheets

(56) References Cited

U.S. PATENT DOCUMENTS

| | | |
|---|---|---|
| 2009/0140608 A1 | 6/2009 | Kasai |
| 2015/0200611 A1* | 7/2015 | Yamamoto .............. H02N 2/026 310/323.03 |
| 2015/0280615 A1 | 10/2015 | Yamasaki et al. |

FOREIGN PATENT DOCUMENTS

| | | |
|---|---|---|
| CN | 106992711 A | 7/2017 |
| EP | 0880185 A2 | 11/1998 |
| JP | H08294289 A | 11/1996 |
| JP | 2011072130 A | 4/2011 |
| JP | 2013198264 A | 9/2013 |
| JP | 2015136205 A | 7/2015 |

OTHER PUBLICATIONS

Office Action issued in Chinese Appln. No. 201710284779.8 dated Mar. 11, 2019. English translation provided.

* cited by examiner

MOTOR AND APPARATUS USING THE SAME

BACKGROUND OF THE INVENTION

Field of the Invention

The present invention relates to a motor and an apparatus using the same.

Description of the Related Art

A friction drive type ultrasonic motor (vibration-wave motor) using a deformation based on a piezoelectric effect of a piezoelectric element as a driving source has a generative force larger than that of an electromagnetic motor and can drive a driven part without providing a deceleration mechanism. Moreover, it drives the driven part using friction, thus enabling drive with a large holding force and excellent quietness. Japanese Patent Laid-Open No. 2015-136205 discloses a linear vibration type motor that includes a vibrator having an elastic member provided with two pressure contact parts and a piezoelectric element, and a contacted member contacting the pressure contact parts pressed by a pressing spring. Furthermore, Japanese Patent Laid-Open No. 2011-72130 discloses a vibration-wave motor mechanism including a configuration different from that of the motor disclosed in Japanese Patent Laid-Open No. 2015-136205.

The friction drive type vibration-wave motor can provide a desired performance by maintaining the pressing force of a pressure contact part at a predetermined value. Large pressing force increases the generative force but suppresses driving vibrations of a vibrating body, thus increasing consumed power to keep the same speed, whereby electromechanical conversion efficiency lowers. Conversely, small pressing force decreases the generative force. Especially, when two pressure contact parts are provided, balance of the pressing force to both pressure contact parts are important. Imbalanced pressing force to both pressure contact parts makes a deformation, which should be normally symmetric with respect to a driving direction, asymmetric, reduces efficiency, and increases differences of various characteristics according to the driving direction.

In Japanese Patent Laid-Open No. 2015-136205, the pressing spring, which presses the two pressure contact parts onto the contacted member, is disposed immediately above the vibrator, and thus stable pressurization to the two pressure contact parts is realized. However, as the pressing spring is disposed immediately above the vibrator, a thickness of the motor increases.

In Japanese Patent Laid-Open No. 2011-72130, a plurality of tension coil springs, which are disposed around a laminated piezoelectric element, presses a sliding member and a friction member so as to cause them to contact each other. However, as the tension coil springs tow the sliding member and a case member, those displacements are restricted to being small, and it becomes difficult to maintain a stable pressing state of the two members to the friction member. Moreover, differences between characteristics of the plurality of tension coil springs are not considered.

SUMMARY OF THE INVENTION

In view of the problem, an object of the present invention is to provide a motor that is thin and that has stable performance.

A motor according to one aspect of the present invention includes a first vibrator, a plurality of biasing parts that are disposed around the first vibrator and that are arranged to press the first vibrator onto a contacting member in contact with the first vibrator, a first pressing member that is biased by the plurality of biasing parts and that includes a pressing part arranged to press the first vibrator by the biasing force of the plurality of biasing parts, and a second pressing member that is biased by the plurality of biasing parts. The first vibrator and the contacting member are arranged to move relatively by vibrations that occur in the first vibrator. The first and second pressing members are arranged to move integrally with the first vibrator while the first vibrator moves. The first pressing member and the first vibrator are arranged to be tiltable around a first direction orthogonal to both of a moving direction of the first vibrator and a biasing direction of the plurality of biasing parts.

An apparatus according to another aspect of the present invention includes a motor, and a member that drives by driving force from the motor. The motor includes a first vibrator, a plurality of biasing parts that are disposed around the first vibrator and that are arranged to press the first vibrator onto a contacting member in contact with the first vibrator, a first pressing member that is biased by the plurality of biasing parts and that includes a pressing part arranged to press the first vibrator by the biasing force of the plurality of biasing parts, and a second pressing member that is biased by the plurality of biasing parts. The first vibrator and the contacting member are arranged to move relatively by vibrations that occur in the first vibrator. The first and second pressing members are arranged to move integrally with the first vibrator while the first vibrator moves. The first pressing member and the first vibrator are arranged to be tiltable around a first direction orthogonal to both of a moving direction of the first vibrator and a biasing direction of the plurality of biasing parts.

Further features of the present invention will become apparent from the following description of exemplary embodiments with reference to the attached drawings.

DESCRIPTION OF THE PREFERRED EMBODIMENTS

Figure 1:
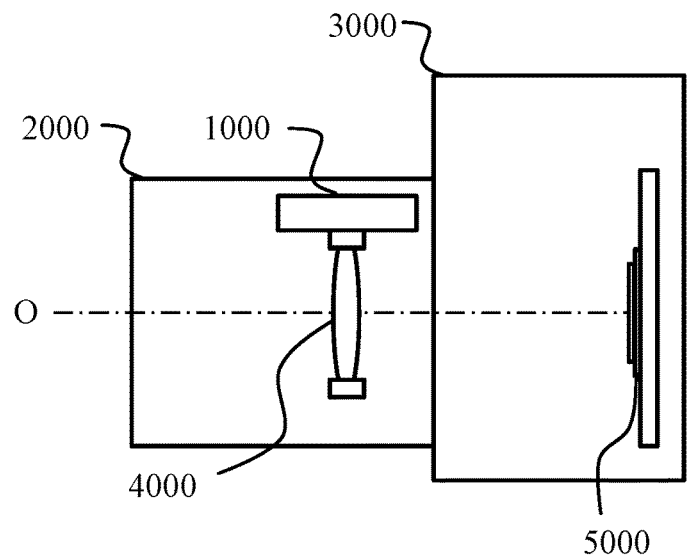
FIG. 1 is a sectional view of an image pickup apparatus including a vibration-wave motor unit according to an embodiment of the present invention.

Referring now to the accompanying drawings, a detailed description will be given of embodiments of the present invention. Those elements in each figure, which are corresponding elements, will be designated by the same reference numerals, and a description thereof will be omitted.

FIG. 1 is a sectional view of an image pickup apparatus (optical apparatus) including a vibration-wave motor unit (a vibration-wave motor or an ultrasonic motor unit, hereinafter, referred to as "motor unit") 1000 according to an embodiment of the present invention. The image pickup apparatus according to this embodiment includes an image pickup lens unit 2000 and a camera body 3000. Inside the image pickup lens unit 2000, the motor unit 1000 and a focusing lens unit 4000, which is attached to the motor unit 1000, are provided. Inside the camera body 3000, an image pickup element 5000 is provided. The motor unit 1000 moves the focusing lens 4000 along an optical axis O while capturing an image. An object image is imaged at a position of the image pickup element 5000, and the image pickup element 5000 generates a focused image. In this embodiment, the image pickup apparatus includes the motor unit 1000, but the present invention is not limited to this. For example, the motor unit 1000 may be mounted on the other optical apparatus, such as a lens unit, or may be mounted on an apparatus different from an optical apparatus. Moreover, in this embodiment, the image pickup lens unit 2000 and the camera body 3000 are integrally configured, but the present invention is not limited to this. The image pickup lens unit 2000 may be detachably attached to the camera body 3000. In other words, an apparatus in the present invention is an apparatus including a vibration-wave motor explained in each example, and a member that drives by driving force from the vibration-wave motor.

First Example

Figure 2A:
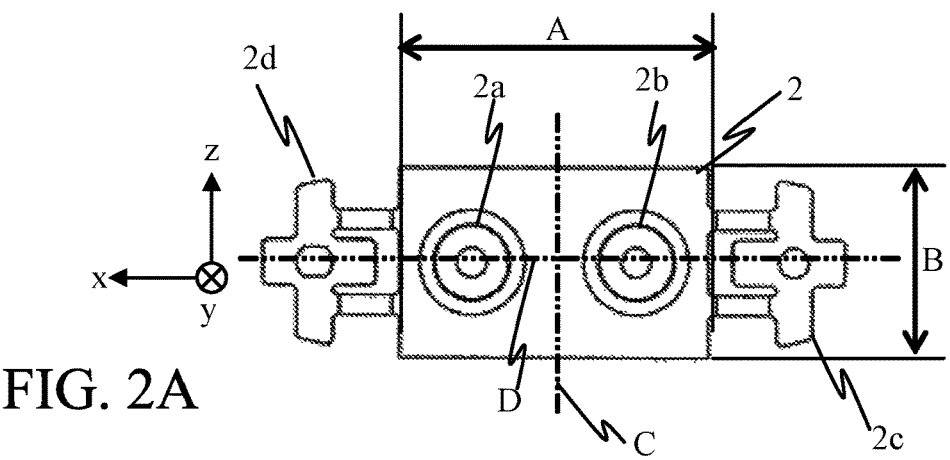
FIGS. 2A and 2B are a plan view and a side view of a vibrator according to a first example.
Figure 2B:
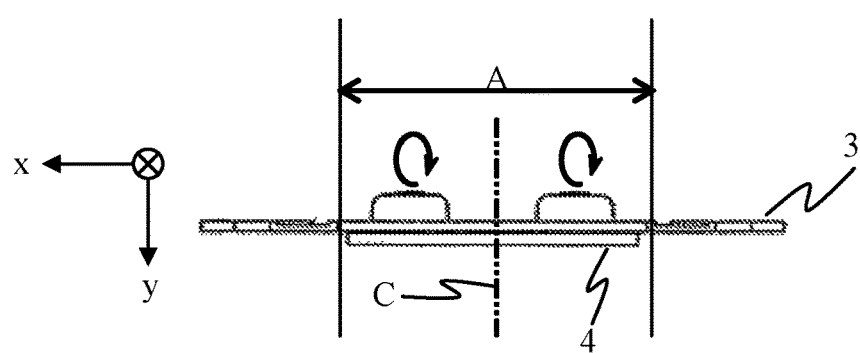

Referring to FIGS. 2A and 2B, a description will be given of a vibrator 2 included in a motor unit 1000A according to this example. FIGS. 2A and 2B are a plan view and a side view of the vibrator 2. FIGS. 2A and 2B are respectively a plan view and a side view of the vibrator 2. The vibrator 2 includes driving protrusions 2a and 2b, and fixed arm parts 2c and 2d. To the vibrator 2, a vibrating plate (elastic plate) 3 and a piezoelectric element 4 are fixed with the adhesive. The piezoelectric element 4 excites ultrasonic vibration by being applied with two-phase high frequency voltages, and an elliptical motion on an x-y plane illustrated in FIG. 2B is energized at ends of the driving protrusions 2a and 2b. In this state, when a friction member comes into frictional contact the driving protrusions 2a and 2b, the vibrator 2 and the friction member relatively move. In this example, a rectangular area A×B, which faces a friction member (contacting member) 7 and includes the driving protrusions 2a and 2b, is a driving force generation area (facing area). Moreover, a plane C, which is orthogonal to the rectangular area A×B and the x-axis, and symmetrically divides the rectangular area A×B, is a front/rear symmetric plane (first plane), and a plane D, which is orthogonal to the rectangular area A×B and the z-axis, and symmetrically divides the rectangular area A×B, is a left/right symmetric plane (second plane). The front/rear symmetric plane C includes a direction orthogonal to both of a moving direction of a moving part and a pressing direction (biasing direction) of pressers (biasing parts), as described below, and the pressing direction of the pressers. Furthermore, the left/right symmetric plane D includes the moving direction of the moving part and the pressing direction of the pressers.

Figure 3A:
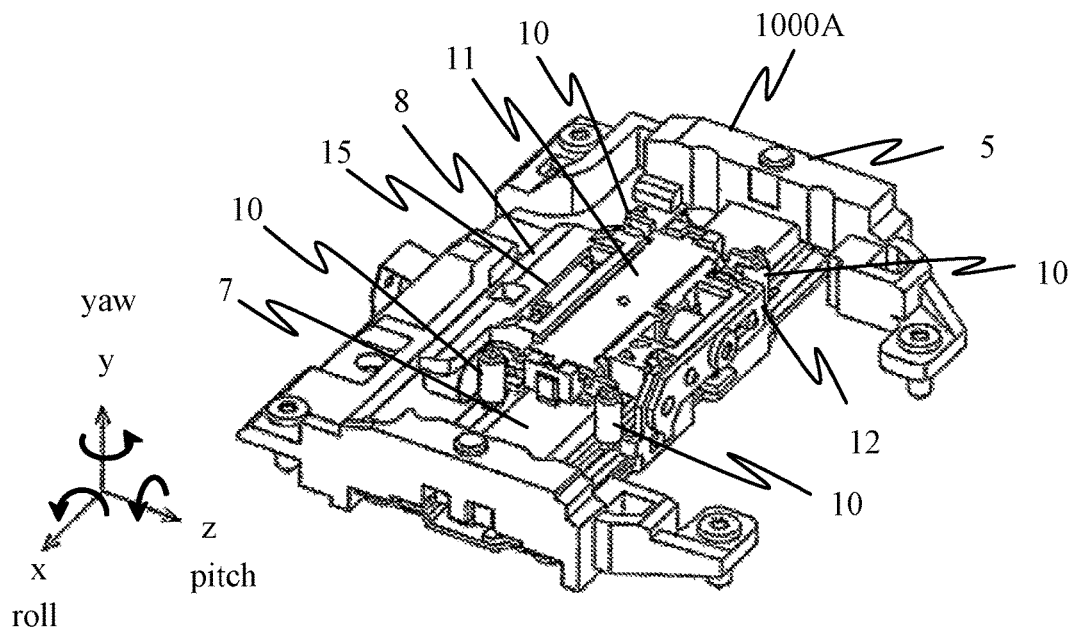
FIGS. 3A and 3B are perspective views of a vibration-wave motor unit according to the first example.
Figure 3B:
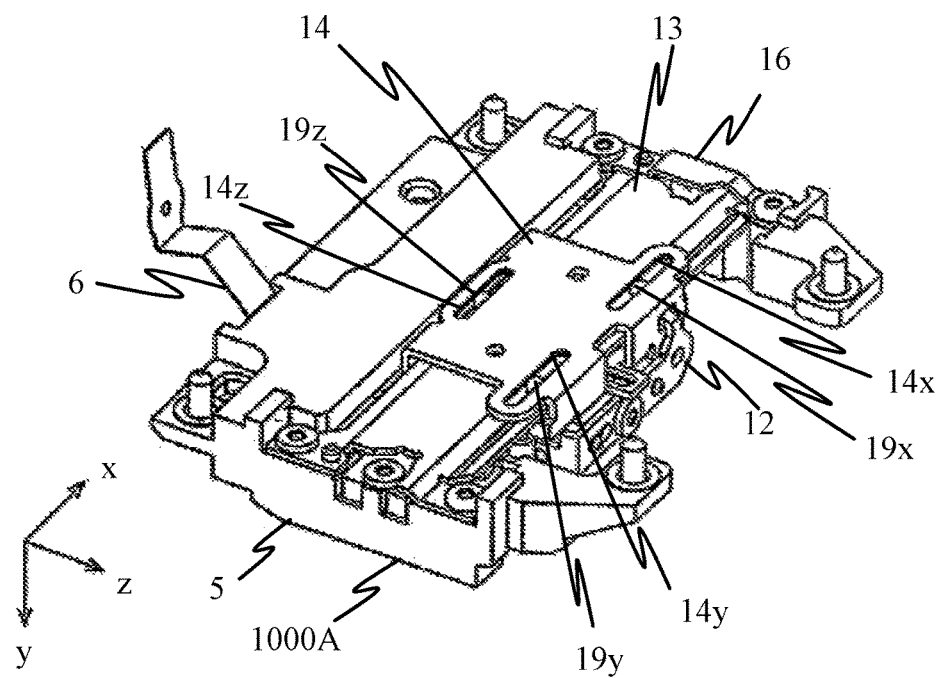
Figure 4:
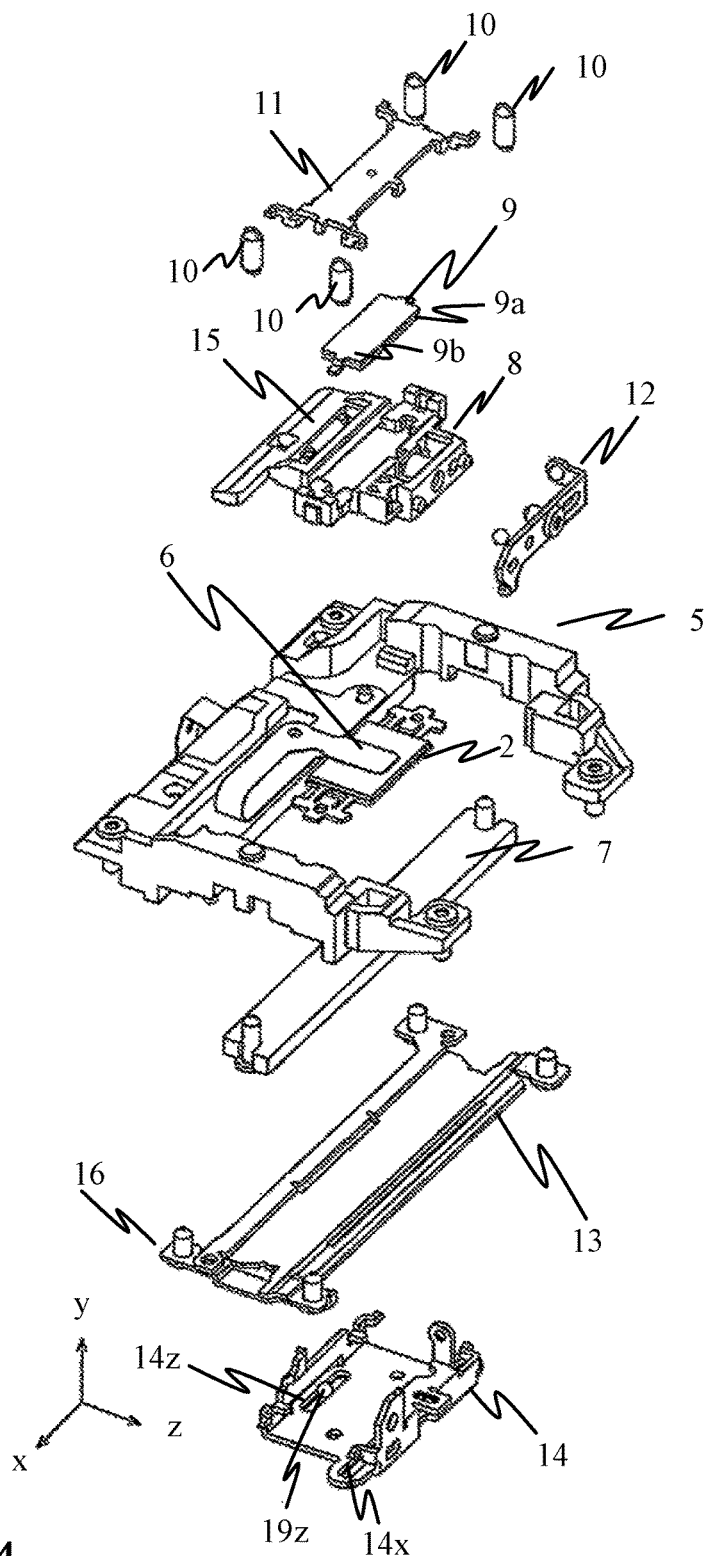
FIG. 4 is an exploded perspective view of the vibration-wave motor unit according to the first example.
Figure 5A:
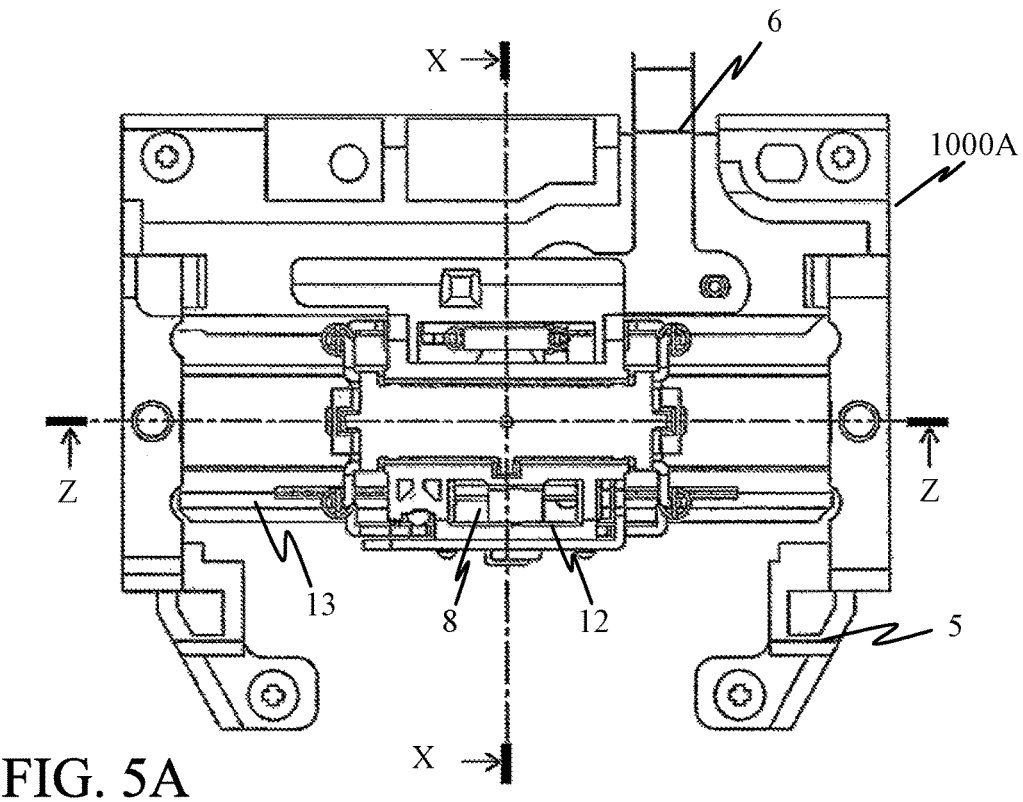
FIG. 5A to 5C are a plan view and sectional views of the vibration-wave motor unit according to the first example.
Figure 5B:
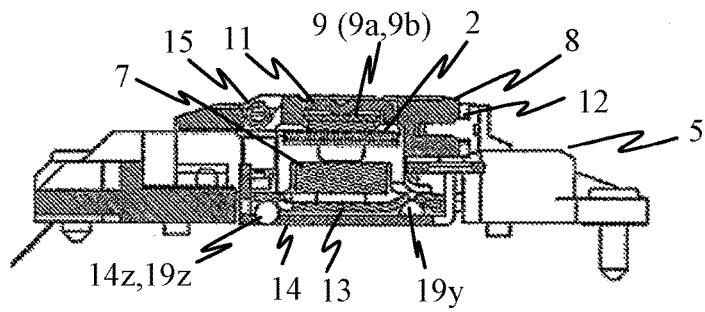
Figure 5C:
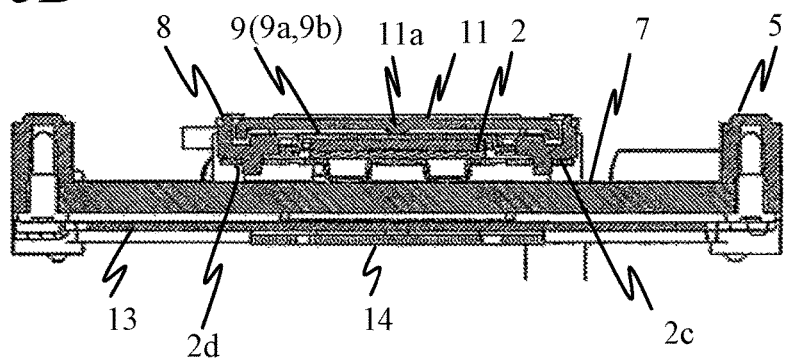

Referring to FIGS. 3A, 3B, 4, and 5A to 5C, a description will be given of a configuration of the motor unit 1000A. FIGS. 3A and 3B are perspective views of the motor unit 1000A. FIG. 3A is a perspective view as seen form a top side, and FIG. 3B is a perspective view as seen from a bottom side. FIG. 4 is an exploded perspective view of the motor unit 1000A. FIGS. 5A to 5C are a plan view and sectional views of the motor unit 1000A. FIG. 5A is a plan view, and FIGS. 5B and 5C are sectional views taken along an x-x line and a z-z line of FIG. 5A, respectively.

A base member 5 is fixed to a fixing member (not illustrated) by the screws, and fixes a friction member 7 using the screws. The friction member 7 comes into frictional contact with the driving protrusions 2a and 2b of the vibrator 2 by pressing force (biasing force) of tension coil springs 10. A flexible substrate 6 is mechanically and electrically connected to the piezoelectric element 4 by the anisotropic conductive paste, and applies the two-phase high frequency voltages to the piezoelectric element 4. A vibrator holding frame 8 is integrated with the vibrator 2 by fixing the fixed arm parts 2c and 2d with the adhesive. A pressing intermediary member 9 includes a felt 9a that contacts the vibrator 2, and a high rigid plate 9b, such as the metal, that receives the pressing force of the tension coil springs 10. The felt 9a transmits the pressing force of the tension coil springs 10 to the vibrator 2 without preventing the vibrations energized in the vibrator 2.

The four tension coil springs (biasing members) 10 are disposed around the vibrator 2, and generates the pressing force in a negative direction (pressing direction) of the y-axis as pressers in this example. A pressing plate (first pressing member) 11 is biased by the tension coil springs 10. The pressing plate 11 also includes a spherical protrusion (pressing part) 11a that abuts against the pressing intermediately member 9 on an intersection line of the front/rear symmetric plane C and the left/right symmetric plane D of the vibrator 2. A coupling sheet metal 12 is fixed to the vibrator holding frame 8 by the screws. A guide member 13 is fixed to the base member 5 by the screws through a fixed sheet metal 16 to be parallel to a contact surface of the friction member 7 with the driving protrusions 2a and 2b. A moving member (second pressing member) 14 is biased by the tension coil springs 10. Rolling balls (rolling members) 19x, 19y and 19z each are sandwiched between the guide member 13 and the moving member 14, and receives the pressing force of the tension coil springs 10. An integrated spring 15 is a tension coil spring that biases the vibrator holding frame 8 and the moving member 14 through the coupling sheet metal 12 to be integrated in the x-axis direction. In this example, a moving part, which includes the vibrator 2, the vibrator holding frame 8, the pressing intermediary member 9, the tension coil springs 10, the pressing plate 11, the coupling sheet metal 12, and the moving member 14, relatively moves along the x-axis with respect to the friction member 7.

Figure 6A:
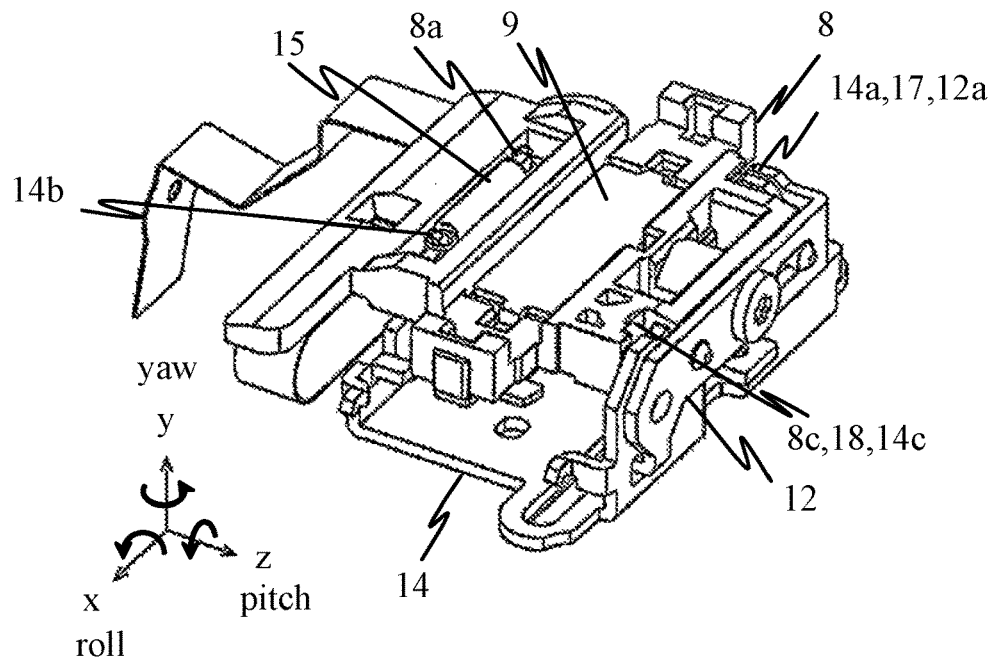
FIGS. 6A to 6E are explanatory diagrams of a degree of freedom in motion of the vibrator according to the first example.

Next, referring to FIGS. 6A to 6E, a description will be given of a degree of freedom in motion of the vibrator 2 according to this example. FIGS. 6A to 6E are explanatory diagrams of the degree of freedom in motion of the vibrator 2. In FIGS. 6A to 6E, components of the motor unit 1000A unnecessary for the explanation are omitted. FIG. 6A illustrates the vibrator holding frame 8 and the moving member 14, which are integrated by biasing force of the integrated spring 15 through the coupling sheet metal 12. The integrated spring 15 is hooked between a hook part 8a provided on the vibrator holding frame 8 and a hook part 14b provided on the moving member 14. A reference ball 17 is sandwiched between a conical hole part 12a formed on the coupling sheet metal 12 and a conical hole part 14a formed on the moving member 14. A rolling ball 18 is sandwiched between a V-shape groove 8b formed on the vibrator holding frame 8 and a plane part 14c formed on the moving member 14. Sandwiching the rolling ball 18 between the V-shape groove 8b and the plane part 14c restricts rotation of the vibrator holding frame 8 and the moving member 14 in the rotational direction (yaw direction) around the y-axis centering the reference ball 17.

Figure 6B:
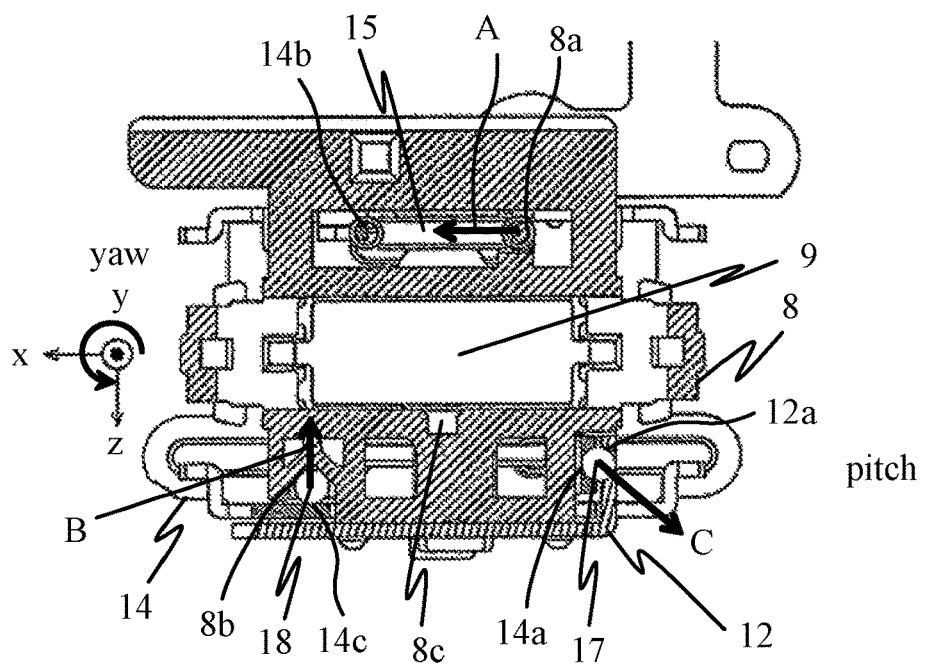

FIG. 6B illustrates a sectional view of the motor unit 1000A cut on a plane containing setting centers of the integrated spring 15, the reference ball 17, and the rolling ball 18. Arrows A to C each represent force for acting on the vibrator holding frame 8. The force represented by the arrow A is force for biasing the vibrator holding frame 8 by the integrated spring 15 to rotate the vibrator holding frame 8 around the reference ball 17. The force represented by the arrow B is force for acting on the V-shape groove 8b from the plane part 14c through the rolling ball 18. Sandwiching the rolling ball 18 between the V-shape groove 8b and the plane part 14c restricts the rotation of the vibrator holding frame 8 and the moving member 14 around the reference ball 17, that is, the rotation of the vibrator holding frame 8 in the yaw direction is restricted. Then, moments of the forces A and B around the reference ball 17 balances.

Figure 6C:
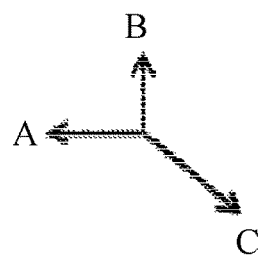

The force C is force for acting on the vibrator holding frame 8 through the coupling sheet metal 12, balancing with resultant force of the forces A and B as illustrated in FIG. 6C. Thus, the degree of freedom in motion in the x-axis direction (x-axis translation direction) and the z-axis direction (z-axis translation direction) of the vibrator holding frame 8 is restricted. Moreover, as the reference ball 17 is sandwiched between the conical hole part 12a and the conical hole part 14a, the degree of freedom in motion in the y-axis direction (y-axis translation direction) of the vibrator holding frame 8 is also restricted.

As described above, in this example, the motion of the vibrator holding frame 8, which is integrated with the vibrator 2, to the moving member 14 has two degrees of freedom in the rotational direction (roll direction) around the x-axis and the rotational direction (pitch direction) around the z-axis. In this example, as the vibrator 2 has the two degrees of freedom in motion in the roll direction and in the pitch direction, the driving protrusions 2a and 2b of the vibrator 2 can abut against the friction member 7 certainly. Additionally, the forces A to C, which restrict the degree of freedom in motion of the vibrator 2, balance within one plane, thus not generating unbalance of unnecessary force to the driving protrusions 2a and 2b.

Figure 6D:
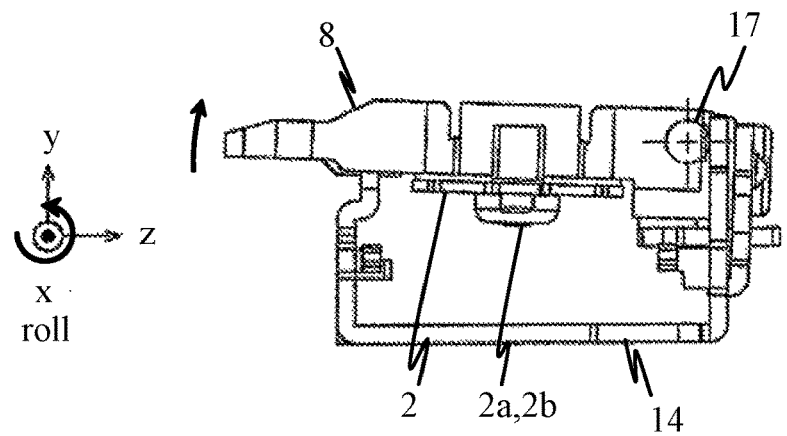
Figure 6E:
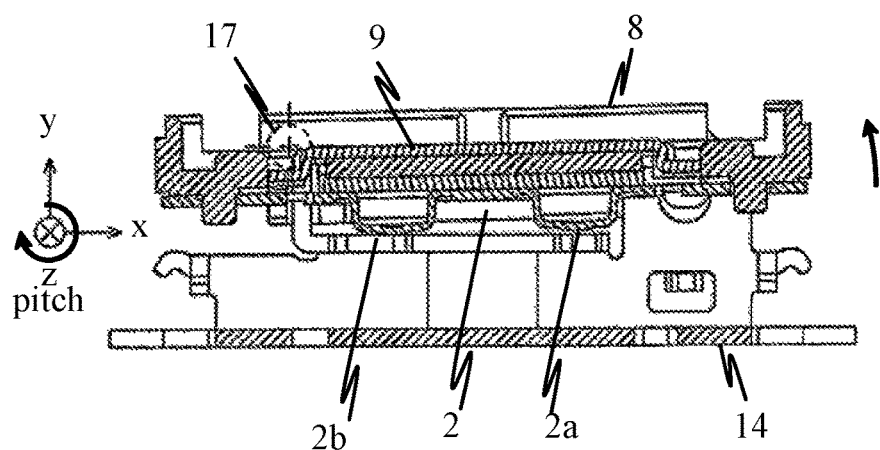

FIGS. 6D and 6E respectively illustrate states where the vibrator holding frame 8 rotates in the roll direction and in the pitch direction around the reference ball 17. As illustrated in FIGS. 6D and 6E, the rotation in the roll direction moves the driving protrusions 2a and 2b up and down along the y-axis direction, and the rotation in the pitch direction can correspond to differences between positions in the y-axis direction.

Figure 7:
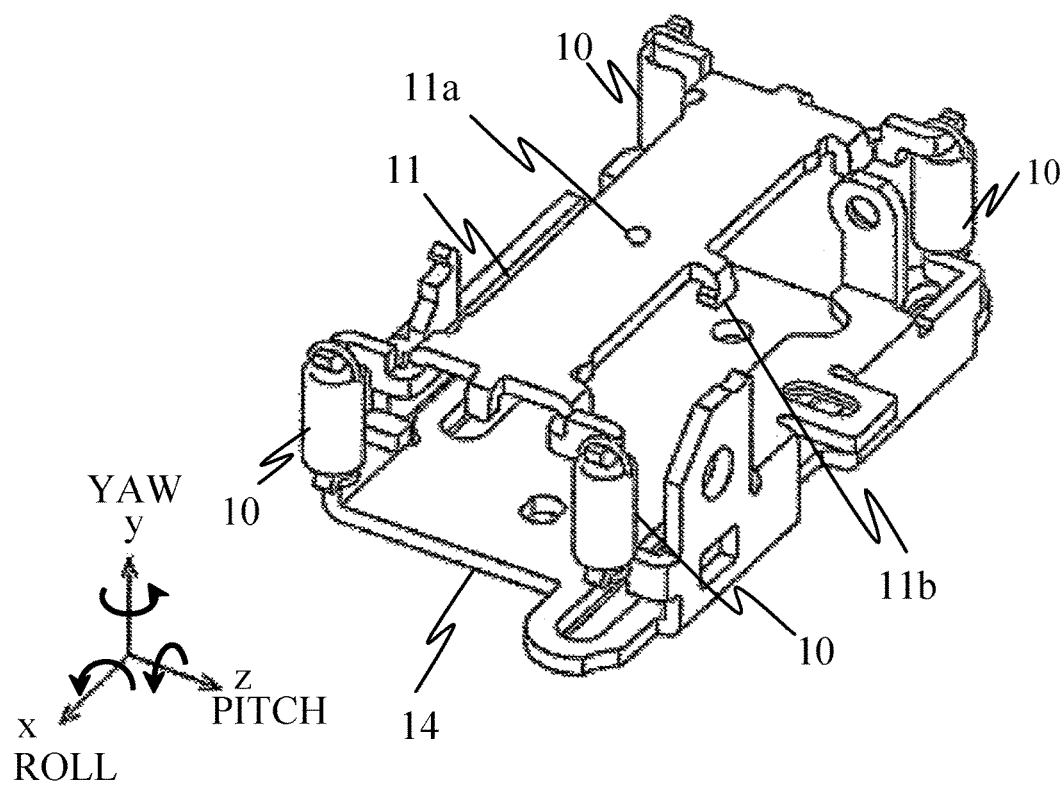
FIG. 7 is an explanatory diagram of a relation between a pressing plate and a moving member according to the first example.

FIG. 7 is an explanatory diagram of a relation between the pressing plate 11 and the moving member 14. The four tension coil springs 10 engage each of spring hook parts of the pressing plate 11 and the moving member 14. As a distance in the y-axis direction between the pressing plate 11 and the moving member 14 is determined by unillustrated components of the motor unit 1000A, the four tension coil springs 10 bias the pressing plate 11 and the moving member 14. The four tension coil springs 10 are symmetrically disposed at equal intervals from the spherical protrusion 11a and have the same specification. However, biasing force of each tension coil spring at a predetermined length is not necessarily the same due to production tolerance, and error in a position of each of spring hook parts of the pressing plate 11 and the moving member 14 is also caused due to production precision in a single part and production error of intervening parts. In this example, the pressing plate 11 is abutted against the pressing intermediary member 9 by the spherical protrusion 11a, and has the degree of freedom in motion (tilt) in the roll direction and the pitch direction with the spherical protrusion 11a as a fulcrum.

In other words, the pressing part 11 can tilt around the axis orthogonal to the front/rear symmetric plane C in the left/right symmetric plane D and around the axis orthogonal to the left/right symmetric plane D in the front/rear symmetric plane C. The pressing part need not be strictly tiltable around each axis, and is regarded to be tiltable around each axis even when shifting by a few mm from each axis. For example, although being different according to performance and a use, shifts may be about ±0.2 mm. Accordingly, the pressing force of the four tension coil springs 10 acting on the driving protrusions 2a and 2b from the spherical protrusion 11a through the pressing intermediary member 9 each are adjusted optimally with respect to the production tolerance.

The axis as a center in tilting the pressing plate 11 may be defined as follows. That is, when a direction orthogonal to a moving direction of a first vibrator and a pressing direction of a plurality of pressures is a first direction (z-axis direction), the first pressing member is tiltable around the first direction. This definition is common to the following examples.

Moreover, the pressing plate 11 has the degree of freedom in motion in the roll and pitch directions relative to the vibrator holding frame 8 including the pressing intermediary member 9, an attitude of the pressing plate 11 with respect to the moving member 14 is adjusted to be an optimum state regardless of a tilt of the vibrator holding frame 8 and a change of the tilt. Thus, the pressing force of each of the four tension coil springs 10 acting on the driving protrusions 2a and 2b from the spherical protrusion 11a through the pressing intermediary member becomes stable without variations. In addition, although the distance in the y-axis direction between the pressing plate 11 and the moving member 14 may change, a spring constant of the tension coil springs can be smaller than that of a plate springs, and this is advantageous to stabilization of the pressing force.

Besides, as a protrusion 11b provided on the pressing plate 11 engages a groove part 8c as illustrated in FIG. 6B formed on the vibrator holding frame 8, the pressing plate 11 and the moving member 14 are integrated in the x-axis direction. Accordingly, the pressing force of the tension coil springs 10 becomes stable without changing a positional relation among the tension coil springs 10, the pressing plate 11, and the moving member 14 while the moving part moves along the x-axis.

Figure 8A:
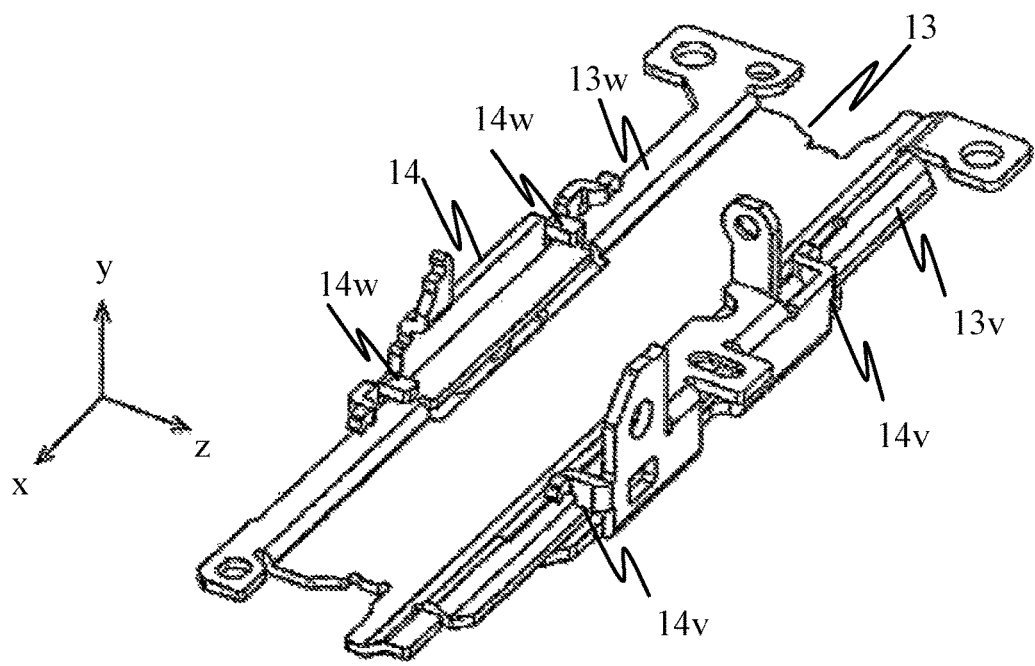
FIGS. 8A and 8B are perspective views of a straight guide member according to the first example.
Figure 8B:
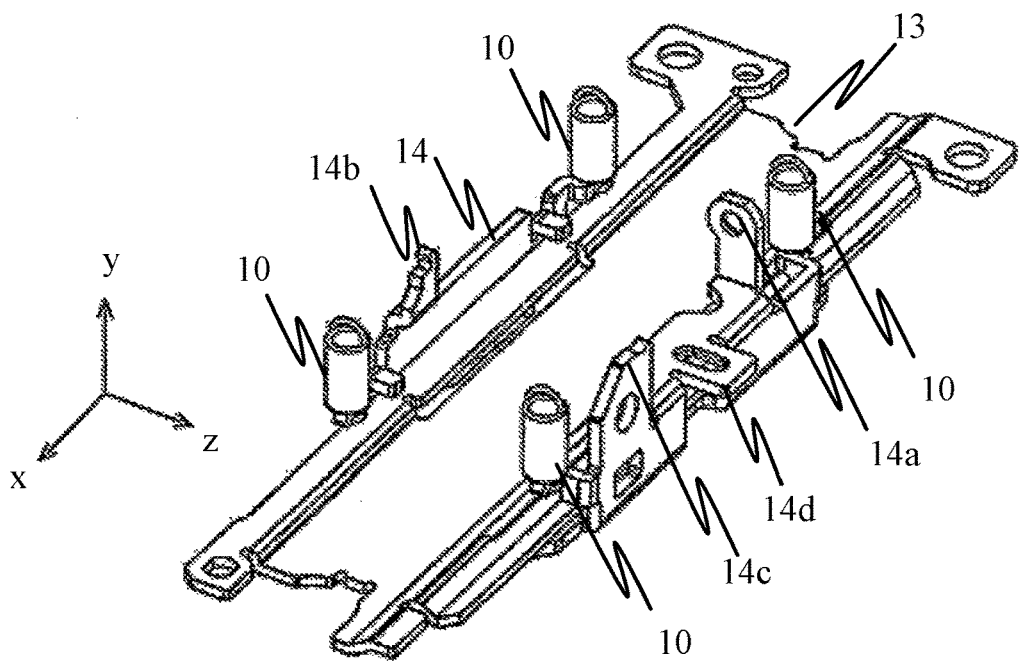

FIGS. 8A and 8B are perspective views of a straight guide member including the guide member 13, the moving member 14, and the rolling balls 19x, 19y and 19z, which are sandwiched between both members. FIGS. 9A to 9D are explanatory diagrams of the straight guide member. On the moving member 14, straight guide grooves 14x, 14y an 14z, which respectively engage the rolling balls 19x, 19y and 19z, are formed to be parallel to the x-axis direction (moving direction of the moving part). The straight guide grooves 14x and 14y are tandemly formed along the x-axis, that is, are separately formed on the same straight line parallel to the x-axis. The straight guide groove 14z is also formed along the x-axis to separate from the straight holding grooves 14x and 14y in the z-axis direction. When the rolling balls 19x, 19y and 19z rolls, the moving member 14 smoothly moves along the x-axis with respect to the guide member 13 while receiving the pressing force of the tension coil springs 10.

Figure 9A:
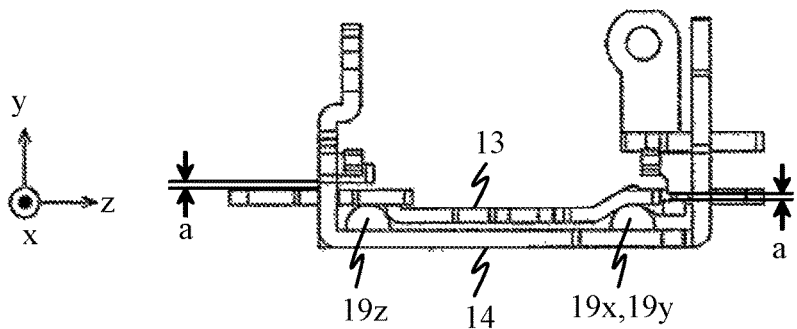
FIGS. 9A to 9D are explanatory diagrams of the straight guide member according to the first example.
Figure 9B:
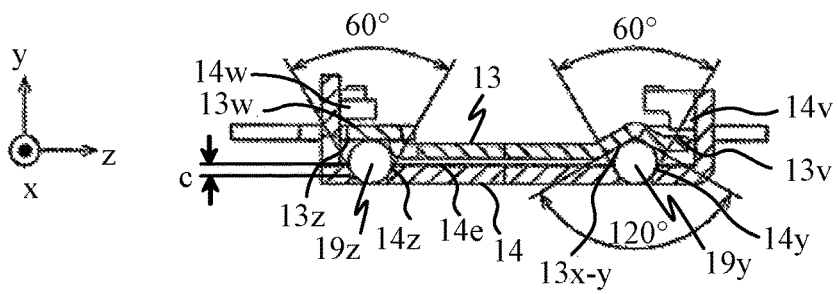

FIG. 9A illustrates a state where the guide member 13 and the moving member 14 abut against the rolling balls 19x, 19y and 19z. FIG. 9B also illustrates a sectional view of a plane including the rolling balls 19y and 19z in the state of FIG. 9A. On part of each of the straight guide grooves 14x, 14y and 14z, a surface having an opening angle of 60 degrees is formed to be engageable with each rolling ball. On the guide member 13, a guide wall 13x-y is continuously formed along the x-axis to be opposite to the straight guide grooves 14x and 14y and to engage the rolling balls 19x and 19y. The guide wall 13x-y has an opening angle of 120 degrees to be engageable with each rolling ball. Additionally, on the guide member 13, a guide plane part 13z is formed along the x-axis in parallel with the x-z plane to be opposite to the straight guide groove 14z and to engage the rolling ball 19z. In this example, the surface having the opening angle of 60 degrees is formed on part of each straight guide groove, but the present invention is not limited to this. For example, a plane having a predetermined angle with respect to the x-z plane may be formed along the x-axis on part of each straight guide groove, and the whole straight guide groove may be formed as a V-shape groove having a predetermined opening angle. Furthermore, in this example, the guide wall 13x-y has the opening angle of 120 degrees, but the present invention is not limited to this. For example, the guide wall 13x-y may be formed along the x-axis to have a predetermined angle with respect to the x-z plane as long as being engageable with each rolling ball.

On the guide member 13, plane parts 13v and 13w are formed. The moving member 14, as described above, includes the four spring hook parts (engaging parts) that each engage the tension coil springs 10. In the state of FIG. 9A, a restriction part 14v, which is part of each of two of the four spring hook parts, is provided to have an interval "a" to the plane part 13v in the y-axis direction. On the moving member 14, two stoppers 14w are also provided to have an interval "a" to the plane part 13w in the y-axis direction in the state of FIG. 9A.

Figure 9C:
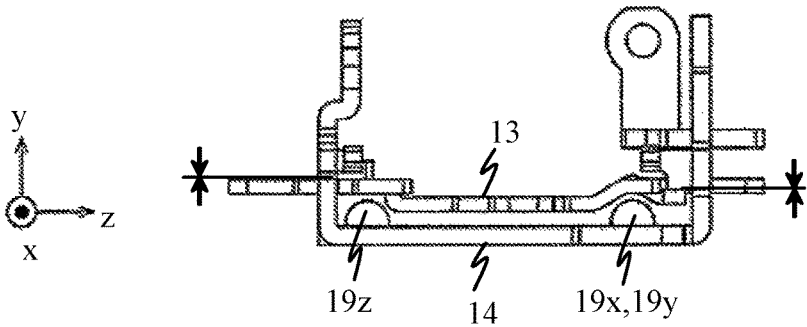
Figure 9D:
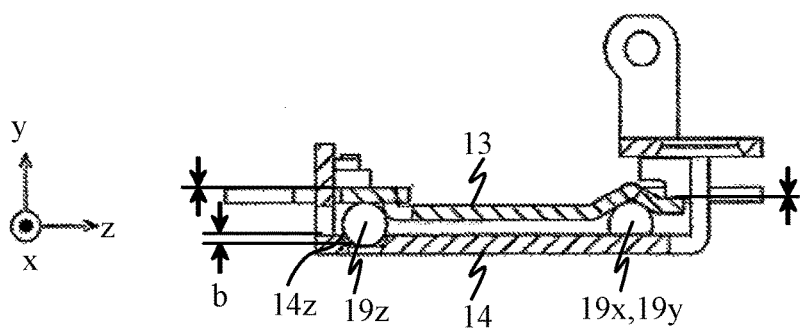

FIG. 9C illustrates a state where the guide member 13 abuts against the moving member 14 in the y-axis direction, that is, a state where the plane parts 13v and 13w respectively engage the two restriction parts 14v and the two stoppers 14w. FIG. 9D also illustrates a sectional view of a plane including the rolling ball 19z in the state of FIG. 9C. In FIG. 9C, the rolling balls 19x, 19y and 19z respectively engage the straight guide grooves 14x, 14y and 14z, but do not contact the guide member 13. Moreover, in FIG. 9D, the rolling balls 19x, 19y and 19z contact the guide member 13, but do not contact the moving member 14. As illustrated in FIG. 9D, the rolling ball 19z overlaps with the straight guide groove 14z by an interval "b" in the z-axis direction when contacting the guide member 13, thus being prevented from falling from the straight guide groove 14z. In addition, the rolling balls 19x and 19y each overlap with the straight guide grooves 14x and 14y by an interval "b" in the z-axis direction, thus being prevented from falling the straight guide groove 14x and 14y.

As mentioned above, providing the plurality of the restriction parts 14v and the stoppers 14w, which respectively engage the plane parts 13v and 13w, can prevent the rolling balls 19x, 19y and 19z from falling. In particular, the restriction parts 14v and the stoppers 14w may be provided so that the interval "a" is shorter than an interval c from a setting surface 14e of the moving member 14 to a position where each rolling member engage the corresponding straight guide groove. In this example, the restricting parts 14v and the stoppers 14w are provided so that the each rolling ball overlaps with the moving member 14 by the interval "b" when the guide member 13 moves in the y-axis direction, that is, so that part of each rolling ball is positioned inside each straight guide groove. In this example, the motor unit 1000A according to this example includes the three rolling balls 19x, 19y and 19z, but the present invention is not limited to this. For example, the three or more rolling balls may be provided, and the guide part of the guide member 13 and the straight guide groove of the moving member 14 may be formed according to the rolling balls. However, when the three or more rolling balls are provided, some rolling balls fail to engage the guide part and the straight guide groove due to production error of the rolling balls and the straight guide grooves, and thus the moving member 14 hardly moves highly accurate. Accordingly, to move the moving member 14 highly accurately, the number of the rolling balls is preferably three.

Moreover, in this example, as illustrated in FIG. 8B, the spring hook parts of the moving member 14 are disposed in a projection plane in the y-axis direction of the guide member 13. Specifically, the spring hook parts are disposed to sandwich the straight guide grooves 14x, 14y and 14z, the guide wall 13x-y, and the guide plane part 13z. Such an arrangement can utilize a space (space on a rear side of a surface provided with the guide wall 13x-y and the guide plane part 13z) on a positive side of the y-axis of the guide member 13 effectively. The conical hole part 14a engaging the reference ball 17, the hook part 14b engaging the integrated spring 15, and an interlocking part 14d described later are also disposed in the projection plane in the y-axis direction of the guide member 13. In particular, each member is disposed to sandwich the straight guide grooves 14x, 14y and 14z, the guide wall 13x-y, and the guide plane part 13z. Utilizing the space on the positive side of the y-axis of the guide member 13 can miniaturize the motor unit 1000A.

Figure 10A:
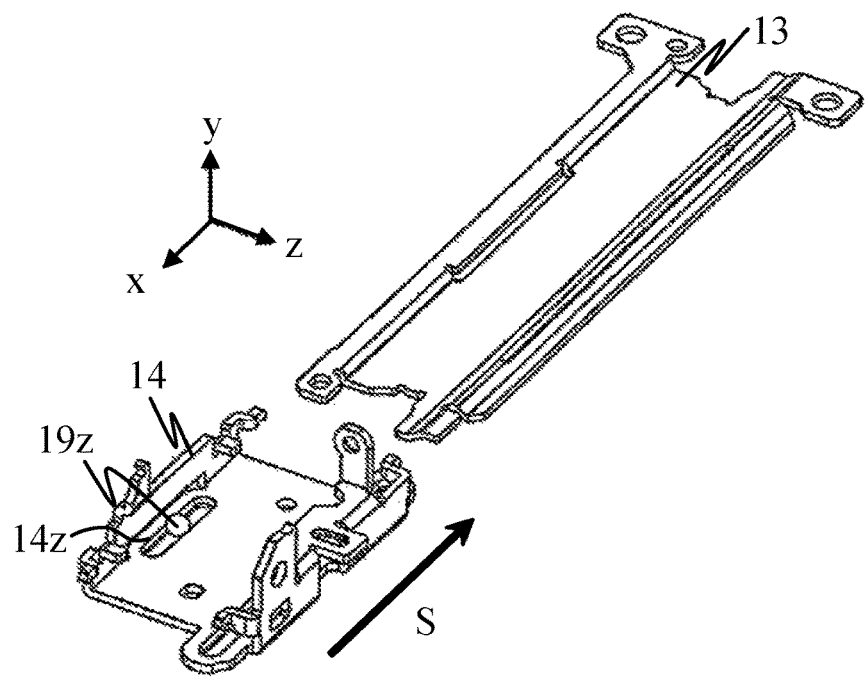
FIGS. 10A and 10B are explanatory diagrams of assembly of the straight guide member according to the first example.
Figure 10B:
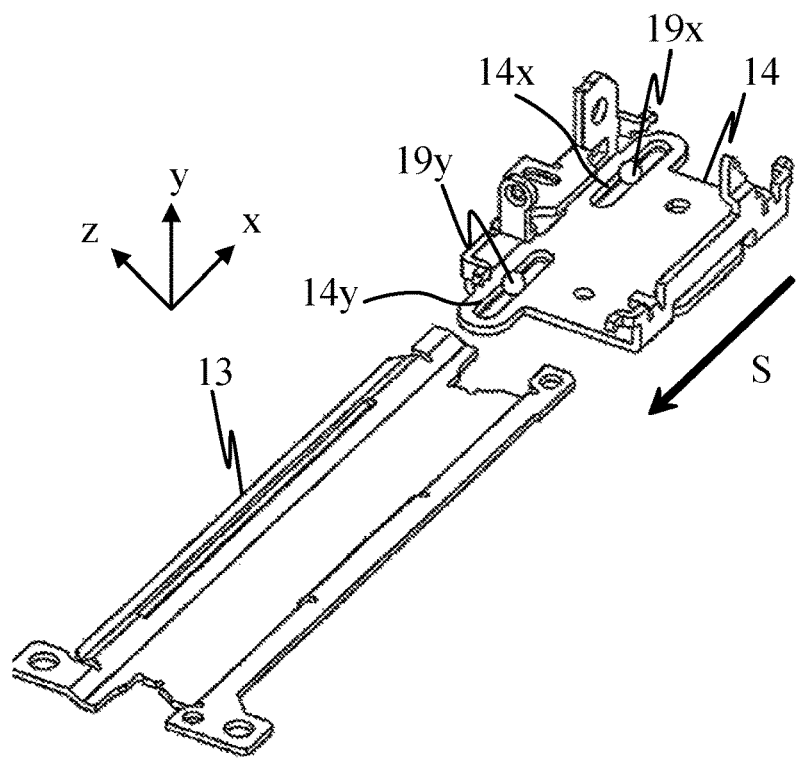

In this example, with the above configuration, it is impossible to assemble the guide member 13, the moving member 14 and the rolling balls 19x, 19y and 19z in the y-axis direction. Thus, in this example, when the rolling balls 19x, 19y and 19z on the straight guide grooves 14x, 14y and 14z of the moving member 14 are inserted in the guide member 13 by sliding in a direction of an arrow S, a state of FIG. 10A or 10B becomes a built-in state illustrated in FIG. 8A.

Figure 11A:
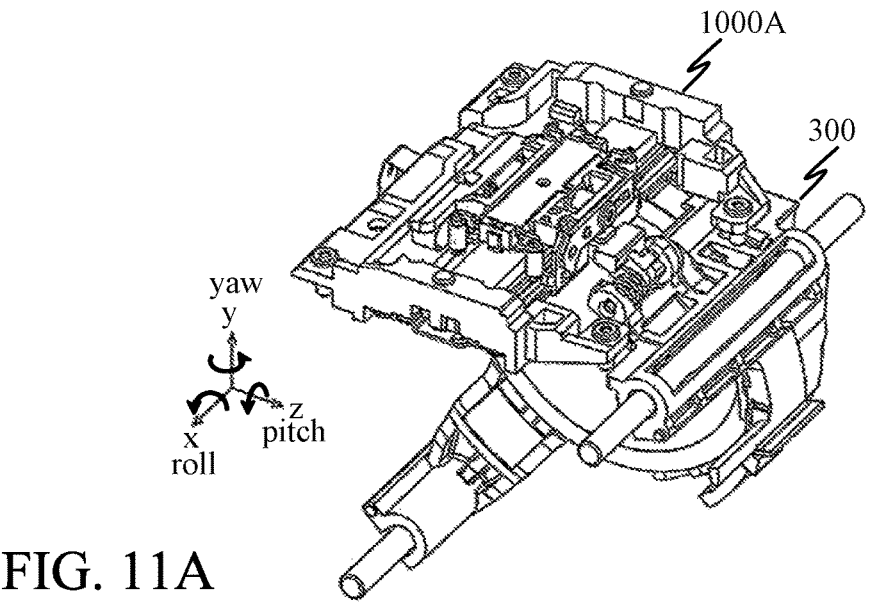
FIGS. 11A to 11D are perspective views of a lens driving unit according to the first example.
Figure 11B:
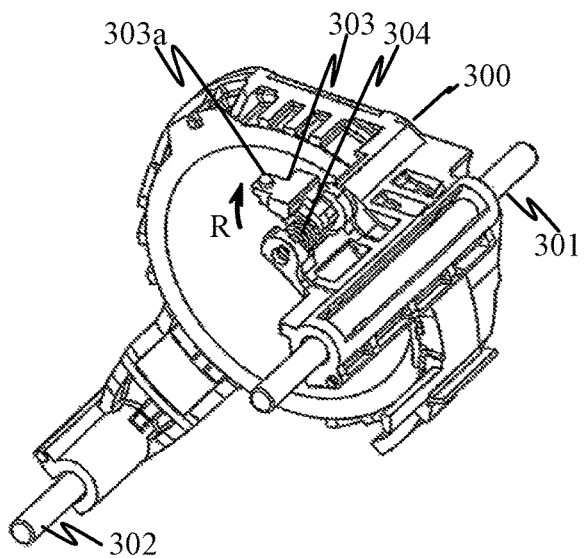
Figure 11C:
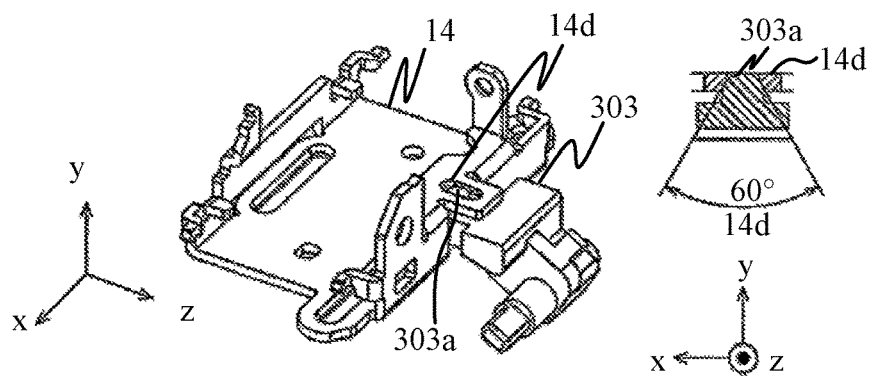
Figure 11D:
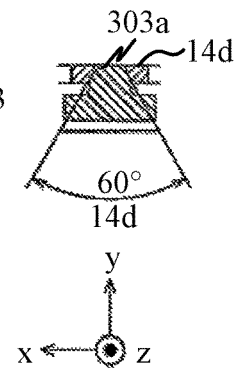

FIG. 11A is a perspective view of a lens driving unit in a state where the motor unit 1000A is attached. FIG. 11B is a perspective view of the lens driving unit in a state where the motor unit 1000A is not attached. FIG. 11C is a diagram illustrating a coupling part of the motor unit 1000A and a lens unit 300. FIG. 11D is a sectional view of the coupling part. The lens unit 300 is supported to be movable along the optical axis (x-axis) by a configuration of a bar and a sleeve. Guide bars 301 and 302 are formed to be parallel to the x-axis, being supported by an unillustrated member. An interlocking member 303 is integrated with the lens unit 300 in the optical axis direction through an interlocking biasing spring 304, and rotating force in a direction of an arrow R is applied to the coupling member 303.

As illustrated in FIG. 11D, on the interlocking part 14d provided on the moving member 14, a groove shape having an opening angle of 60 degrees is formed. By the rotating force in the direction of the arrow R illustrated in FIG. 11B, a spherical interlocking part 303a provided on the interlocking member 303 engages the groove shape formed on the interlocking part 14d, and driving force of the motor unit 1000A is transmitted to the lens unit 300 through the interlocking member 303. The rotating force in the direction of the arrow R of the interlocking member 303 is also received by the guide member 13 through the rolling balls 19x, 19y and 19z. Additionally, positional error in the y-axis direction between the motor unit 1000A and the lens unit 300 is absorbed by the rotation of the interlocking member 303 in the direction of the arrow R, and positional error in the z-axis direction between them is absorbed by moving the engagement position of the groove shape formed on the interlocking part 14d and the spherical interlocking part 303a in the z-axis direction. Thus, even when error in production exits, the motor unit 1000A enables the lens unit 300 to smoothly and certainly move along the optical axis.

Second Example

Figure 12A:
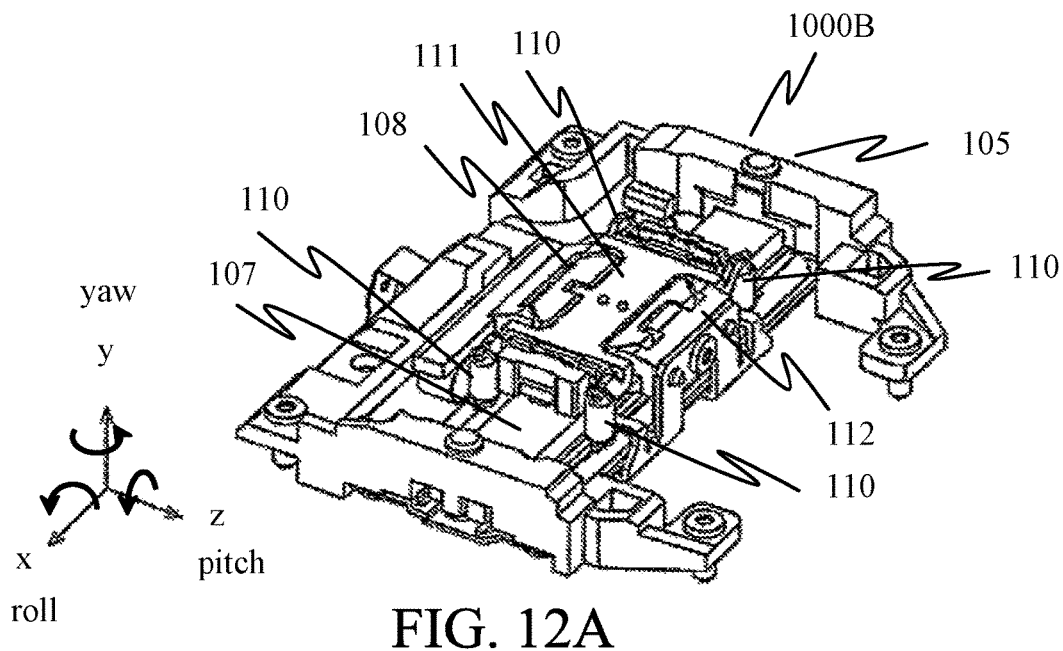
FIGS. 12A and 12B are perspective views of a vibration-wave motor unit according to a second example.
Figure 12B:
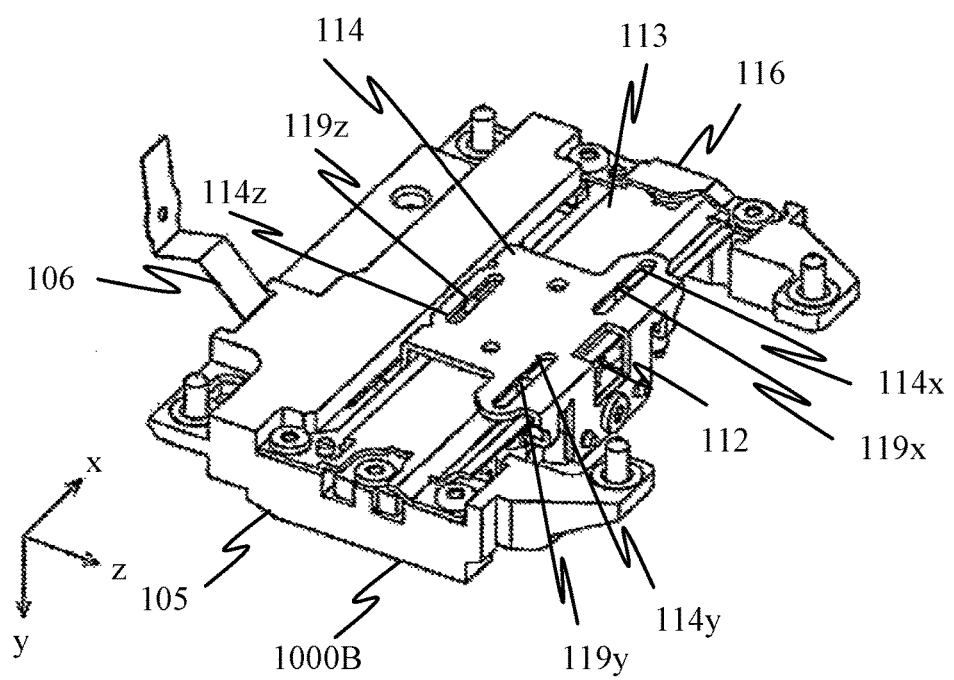
Figure 13:
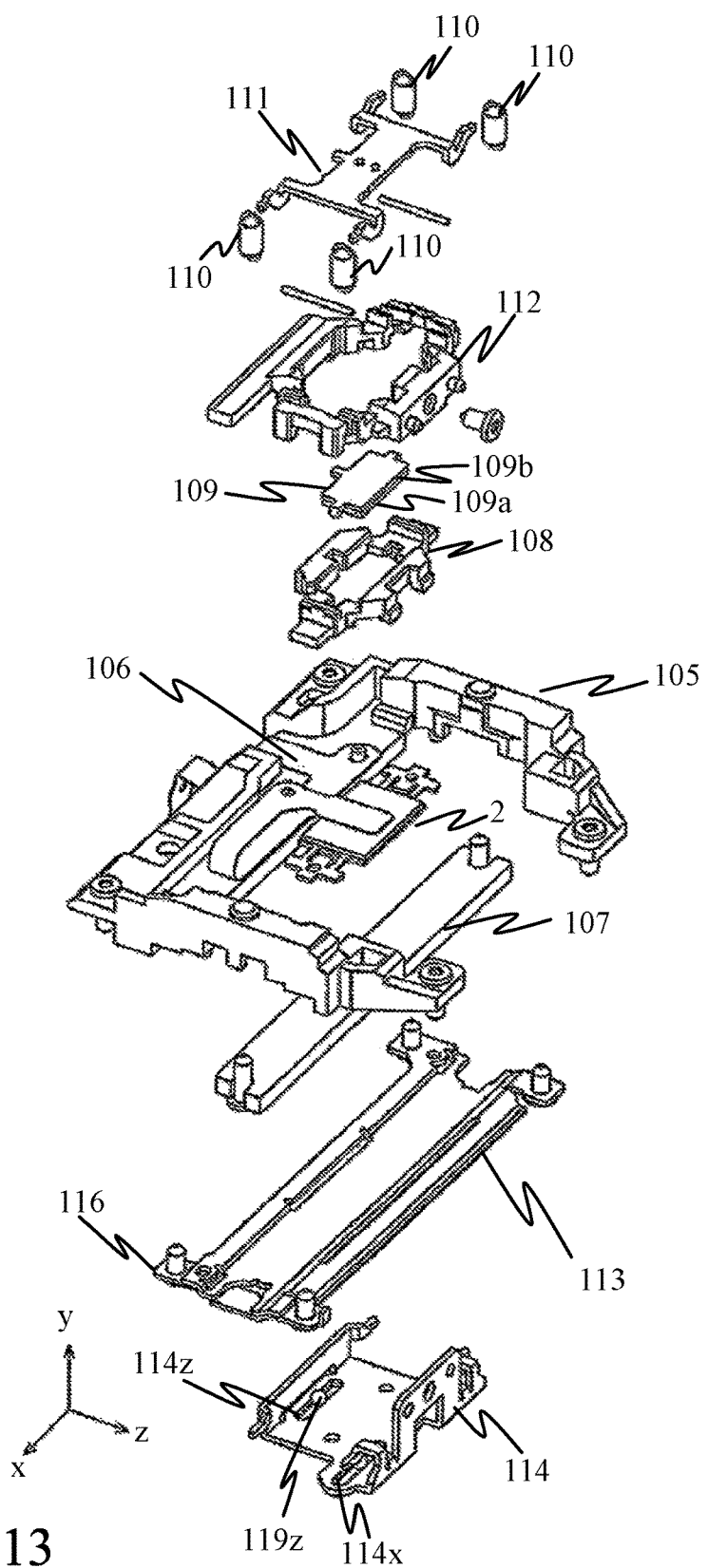
FIG. 13 is an exploded perspective view of the vibration-wave motor unit according to the second example.
Figure 14A:
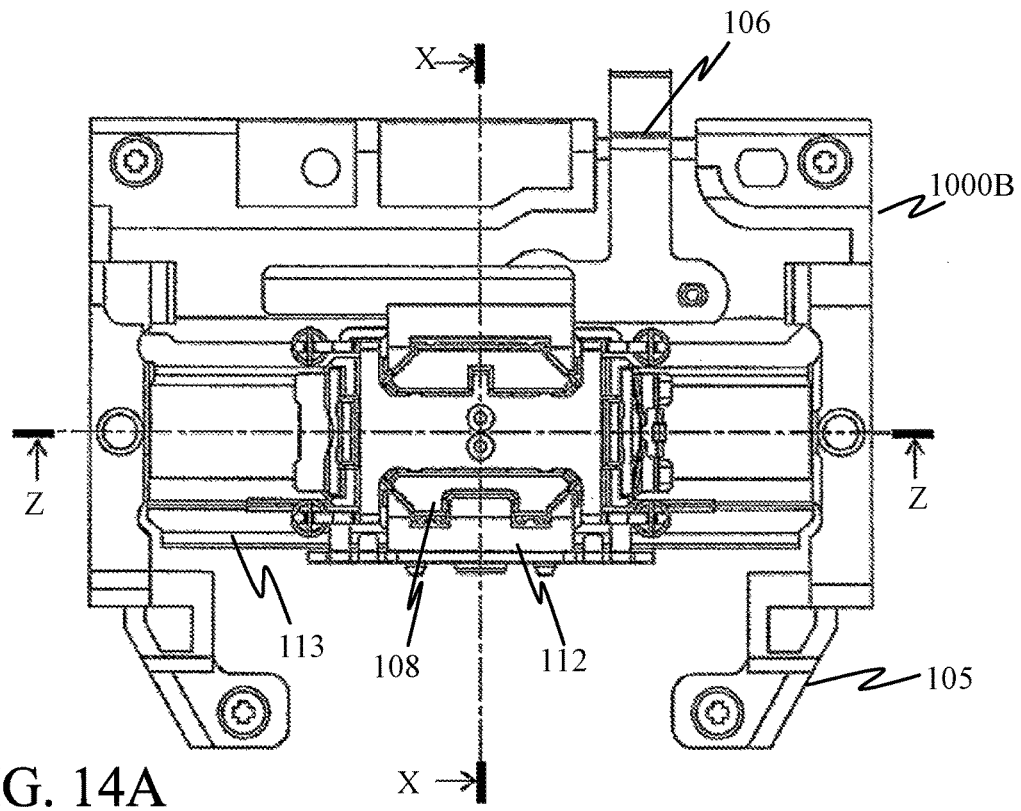
FIGS. 14A to 14C are a plan view and sectional views of the vibration-wave motor unit according to the second example.
Figure 14B:
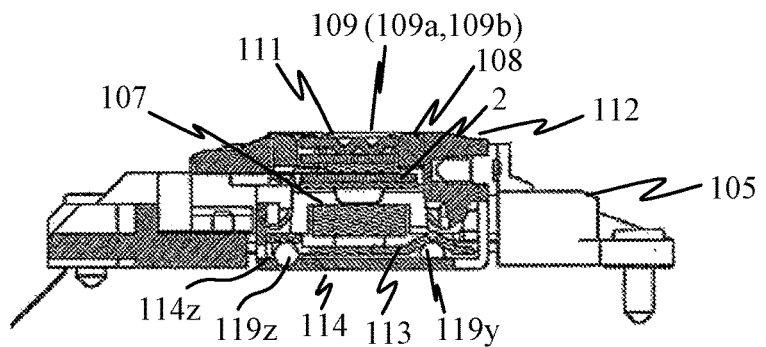
Figure 14C:
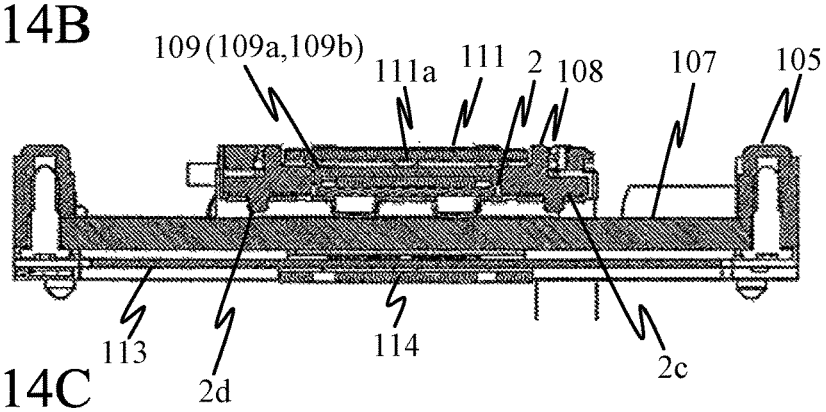

Referring to FIGS. 12A, 12B, 13, and 14A to 14C, a description will be given of a configuration of a vibration-wave motor unit (an ultrasonic motor unit, hereinafter, referred to as "motor unit") 1000B according to this example. FIGS. 12A and 12B are perspective views of the motor 1000B. FIG. 12A is a perspective view as seen form a top side, and FIG. 12B is a perspective view as seen from a bottom side. FIG. 13 is an exploded perspective view of the motor unit 1000B. FIGS. 14A to 14C are a plan view and sectional views of the motor unit 1000B. FIG. 14A is a plan view, and FIGS. 14B and 14C are sectional views taken along an x-x line and a z-z line of FIG. 14A, respectively.

The vibrator 2 included in the motor unit 1000B according to this example is identical with the vibrator 2 of the first example. A base member 105 is fixed to a fixing member (not illustrated) by the screws, and fixes a friction member 107 using the screws. The friction member 107 comes into frictional contact with the driving protrusions 2a and 2b by pressing force of tension coil springs 110. As well as the first example, a flexible substrate 106 is mechanically and electrically connected to the piezoelectric element 4 of the vibrator 2 by an anisotropic conductive paste, and applies the two-phase high frequency voltages to the piezoelectric element 4. A vibrator holding frame 108 is integrated with the vibrator 2 by fixing the fixed arm parts 2c and 2d with the adhesive. A pressing intermediary member 109 includes a felt 109a that contacts the vibrator 2, and a high rigid plate 109b, such as the metal, that receives the pressing force of the tension coil springs 110. The felt 109a transmits the pressing force of the tension coil springs 110 to the vibrator 2 without preventing the vibrations energized in the vibrator 2. The four tension coil springs (biasing members) 110 are disposed around the vibrator 2, and, as described above, generate the pressing force as pressers in this example. A pressing plate (first pressing member) 111 is biased by the tension coil springs 110. The pressing plate 111 also includes two spherical protrusions (pressing parts) 111a that abuts against the pressing intermediately member 109 and that are equally positioned in the y-axis direction. The two spherical protrusions 111a are provided to be symmetric with respect to the left/right symmetric plane D in the front/rear symmetric plane C of the vibrator 2. A moving member outer frame 112 is integrated with a moving member (second pressing member) 114 by the screws. A guide member 113 is fixed to the base member 105 by the screws through a fixed sheet metal 116 to be parallel to a contact surface of the friction member 107 with the driving protrusions 2a and 2b. The moving member 114 is biased by the tension coil springs 110. Rolling balls (rolling members) 119x, 119y and 119z each are sandwiched between the guide member 113 and the moving member 114, and receives the pressing force of the tension coil springs 110. In this example, a moving part, which includes the vibrator 2, the vibrator holding frame 108, the pressing intermediary member 109, the tension coil springs 110, the pressing plate 111, the moving member outer frame 112, and the moving member 114, relatively moves along the x-axis with respect to the friction member 107.

Figure 15A:
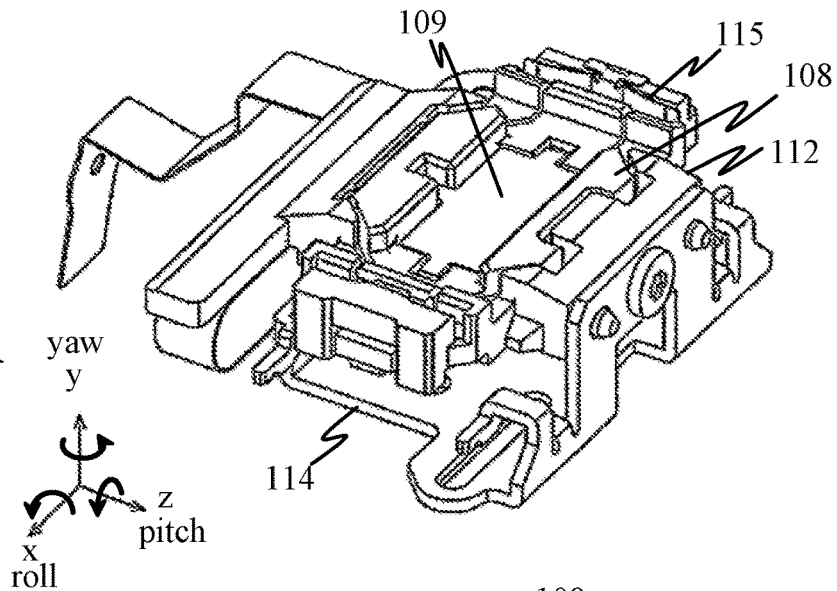
FIGS. 15A to 15C are explanatory diagrams of a degree of freedom of a vibrator according to the second example.
Figure 15B:
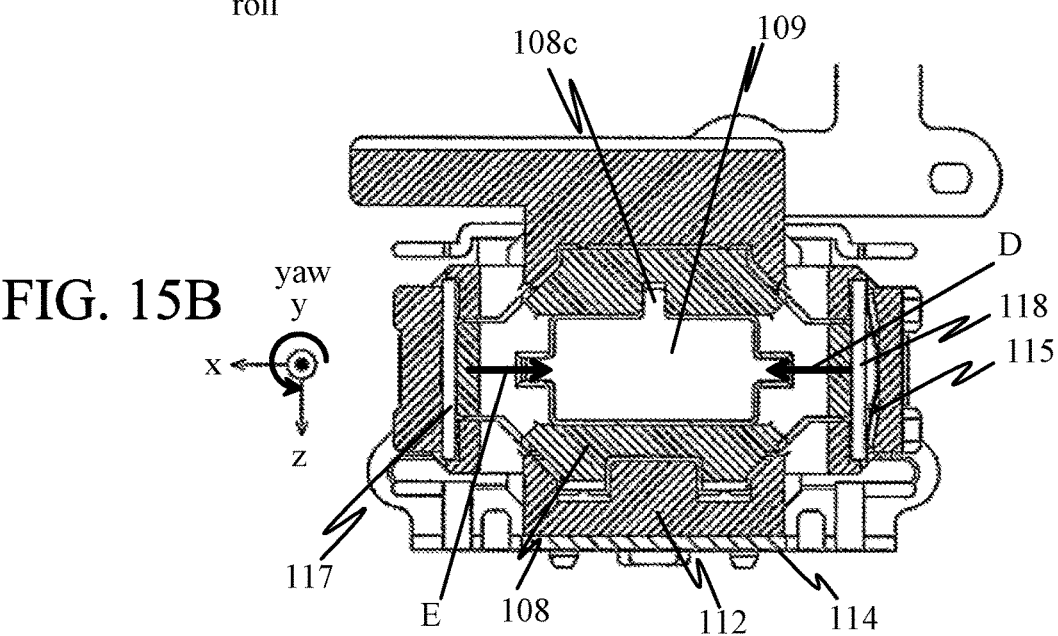
Figure 15C:
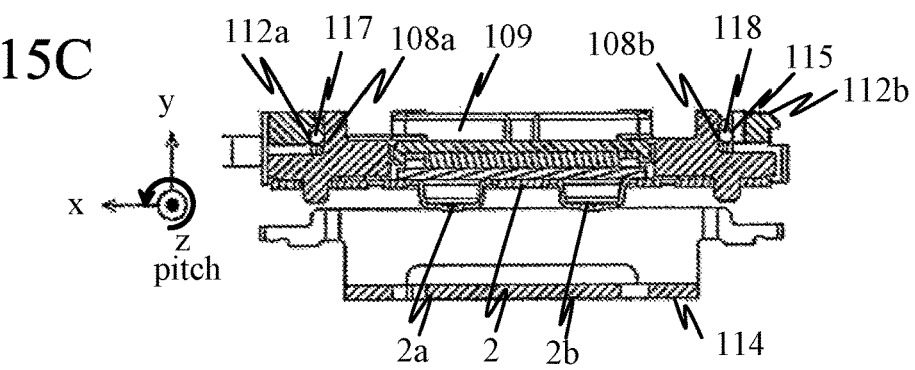

Next, referring to FIGS. 15A to 15C, a description will be given of a degree of freedom in motion of the vibrator 2 according to this example. FIGS. 15A to 15C are explanatory diagrams of the degree of freedom in motion of the vibrator 2. In FIGS. 15A to 15C, components of the motor unit 1000B unnecessary for the explanation are omitted. FIG. 15A illustrates the moving member outer frame 112 and the moving member 114, which are integrated with the vibrator holding frame 108. FIG. 15B illustrates a sectional view of the configuration illustrated in FIG. 15A cut on a plane containing a reference bar 117, and a biased bar 118. FIG. 15C illustrates a sectional view of the configuration illustrated in FIG. 15A cut on the left/right symmetric plane D of the vibrator 2.

An integrated spring 115 is a plate spring fixed to a spring attachment part 112b provided on the moving member outer part 112, and biases a plane part 108b formed on the vibrator holding frame 108 in a direction of an arrow D through the biased bar 118. Moreover, a plane part 108a formed on the vibrator holding frame 108 receives reaction force in a direction of an arrow E in balance with the biasing force in the direction of the arrow D through the reference bar 117 sandwiched between the plane part 108a and a plane part 112a formed on the moving member outer part 112. Thus, the vibrator 108 and the moving part outer frame 112 are integrated in the x-axis direction by the biasing force of the integrated spring 115 through the reference bar 117 and the biased bar 118. Additionally, sandwiching the reference bar 117 between the plane part 112a and the plane part 108a also restricts the rotation of the vibrator holding part 108 in the yaw direction. Furthermore, the vibrator holding frame 108 fits within the moving part outer frame 112 in the z-axis direction, thus restricting the rotation of the vibrator holding frame 108 in the z-axis direction (z-axis translation direction) and the roll direction.

As described above, the motion of the vibrator holding frame 108, which is integrated with the vibrator 2 with respect to the moving member 114, has two degrees of freedom in the y-axis direction (y-axis translation direction) and the pitch direction. In this example, the vibrator 2 has the two degrees of freedom in the y-axis direction and the pitch direction, thus enabling the driving protrusions 2a and 2b of the vibrator 2 to certainly abut against the friction member 107. In addition, the driving protrusions 2a and 2b, and the friction member 107 move by the rotation of the reference bar 117 and the biased bar 118, and thus can decrease friction of the motion. Furthermore, the biasing force in the direction of the arrow D and the reaction force in the direction of the arrow E balance within one plane, thus not generating unbalance of unnecessary force to the driving protrusions 2a and 2b.

Figure 16:
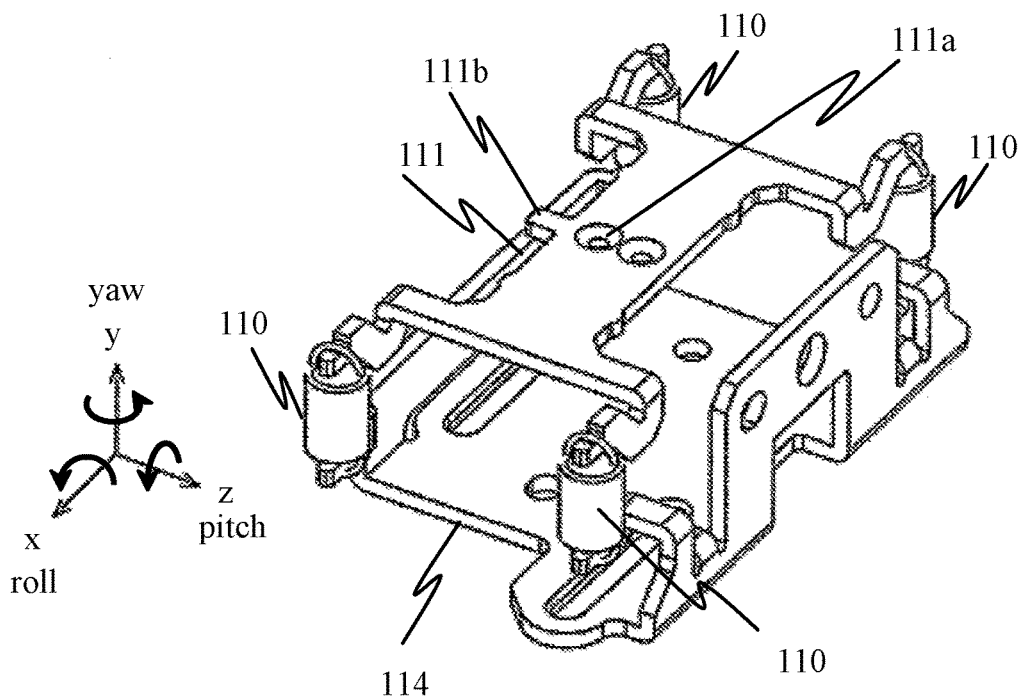
FIG. 16 is an explanatory diagram of a relation between a pressing plate and a moving member according to the second example.

FIG. 16 is an explanatory diagram of a relation between the pressing plate 111 and the moving member 114. The four tension coil springs 110 engage each of spring hook parts of the pressing plate 111 and the moving member 114. As a distance in the y-axis direction between the pressing plate 111 and the moving member 114 is determined by unillustrated components of the motor unit 1000B, the four tension coil springs 110 bias the pressing plate 111 and the moving member 114. In this example, the two spherical protrusions 111a, which are equally positioned in the y-axis direction, abut against the pressing intermediary member 109, and the pressing plate 111 has the degree of freedom in motion (tilt) in the pitch direction with the two spherical protrusions 111a as a fulcrum. In other words, the pressing part 111 can tilt around the axis orthogonal to the left/right symmetric plane D in the front/rear symmetric plane C. The pressing part need not be strictly tiltable around the above axis, and is regarded to be tiltable around the above axis even when shifting by a few mm from the above axis. For example, although being different according to performance and a use, shifts may be about ±0.2 mm. Accordingly, the pressing force of the four tension coil springs 110 acting on the driving protrusions 2a and 2b from the two spherical protrusions 111a through the pressing intermediary member 109 each are adjusted optimally.

Moreover, as the pressing plate 111 has the degree of freedom in motion in the pitch direction relative to the vibrator holding frame 108 including the pressing intermediary member 109, an attitude of the pressing plate 111 with respect to the moving member 114 is adjusted to be an optimum state regardless of a tilt of the vibrator holding frame 108 and a change of the tilt. In addition, although the distance in the y-axis direction between the pressing plate 111 and the moving member 114 may change, a spring constant of the tension coil springs 110 can be smaller than that of a plate spring, and this is advantageous to stabilization of the pressing force.

Besides, as a protrusion 111b provided on the pressing plate 111 engages a groove part 108c as illustrated in FIG. 15B formed on the vibrator holding frame 108, the pressing plate 111 and the moving member 114 are integrated in the x-axis direction through the vibrator holding frame 108. Accordingly, the pressing force of the tension coil springs 110 becomes stable without changing a positional relation among the tension coil springs 110, the pressing plate 111, and the moving member 114 while the motor unit 1000B moves along the x-axis.

Figure 17:
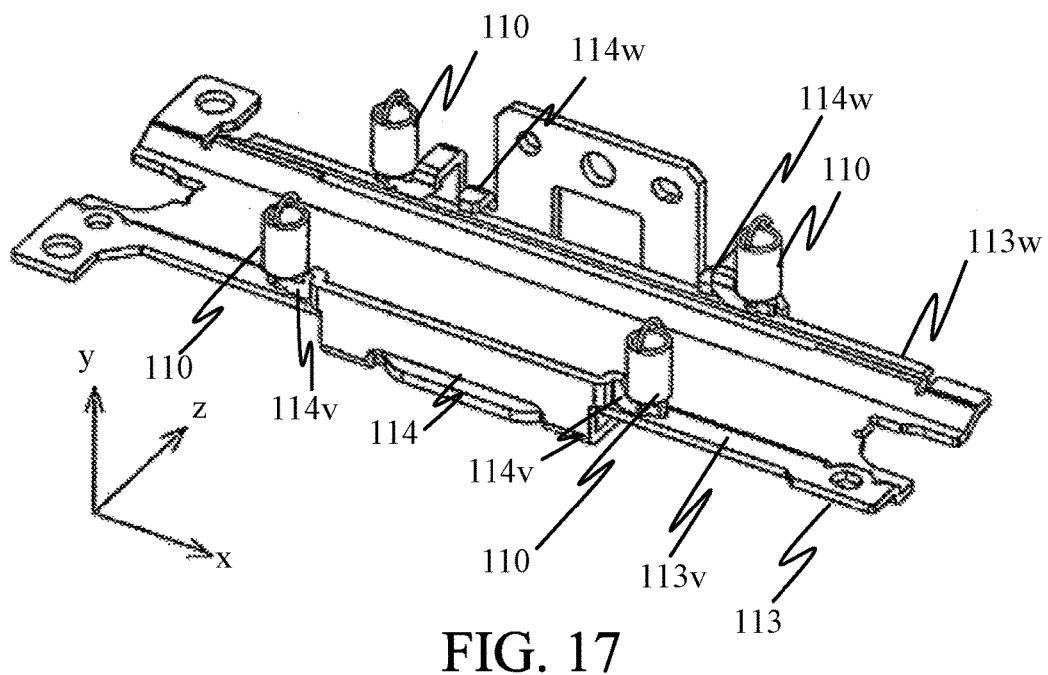
FIG. 17 is a perspective view of a straight guide member according to the second example.

FIG. 17 is a perspective view of a straight guide member including the guide member 113, the moving member 114, and the rolling balls 119x, 119y and 119z, which are sandwiched between both members. A relation among the guide member 113, straight guide grooves 114x, 114y and 114z formed on the moving member 114, and the rolling balls 119x, 119y and 119z are the same as that in the first example, and thus the explanation thereof is omitted. On the guide member 113, plane parts 113v and 113w are formed. The moving member 114, as described above, includes the four spring hook parts that each engage the tension coil springs 110. As with the first example, a restriction part 114v, which is part of each of two of the four hook spring hook parts, is provided to have an interval "a" to the plane part 113v in the y-axis direction in the state where the guide member 113 and the moving member 114 abut against each rolling balls.

On the moving member 114, two stoppers 114w are also provided to have an interval "a" to the plane part 113w in the y-axis direction in the state where the guide member 113 and the moving member 114 abut against each rolling ball. The above configuration prevents the rolling balls 119x, 119y and 119z from falling. Moreover, in this example, as with the first example, the hook spring parts of the moving member 114 are disposed in a projection plane in the y-axis direction of the guide member 113. Such an arrangement can utilize a space on a positive side of the y-axis of the guide member 113 effectively, and can miniaturize the motor unit 1000B.

Figure 18A:
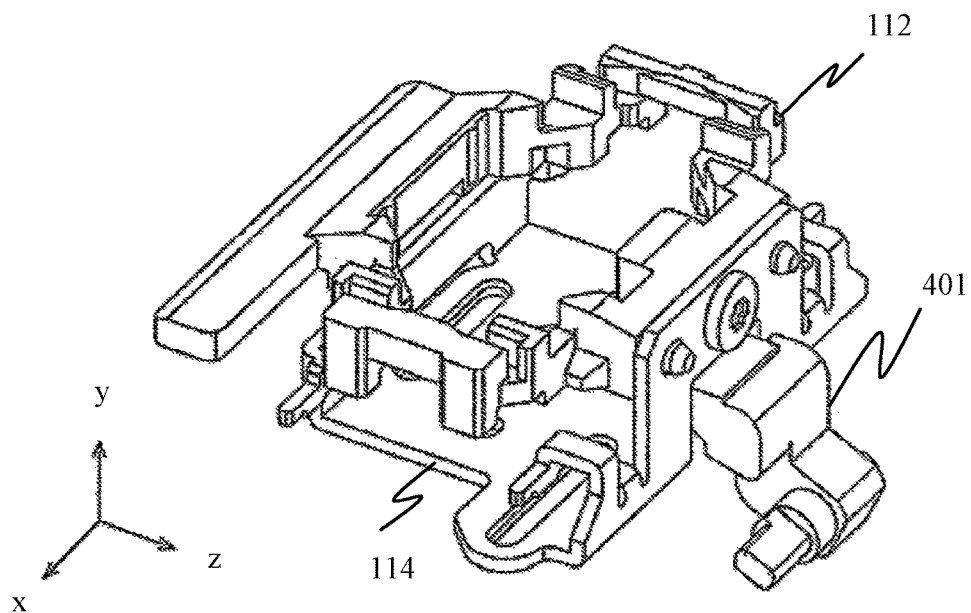
FIGS. 18A and 18B are explanatory diagrams of a coupling part of the vibration-wave motor unit and a lens unit according to the second example.
Figure 18B:
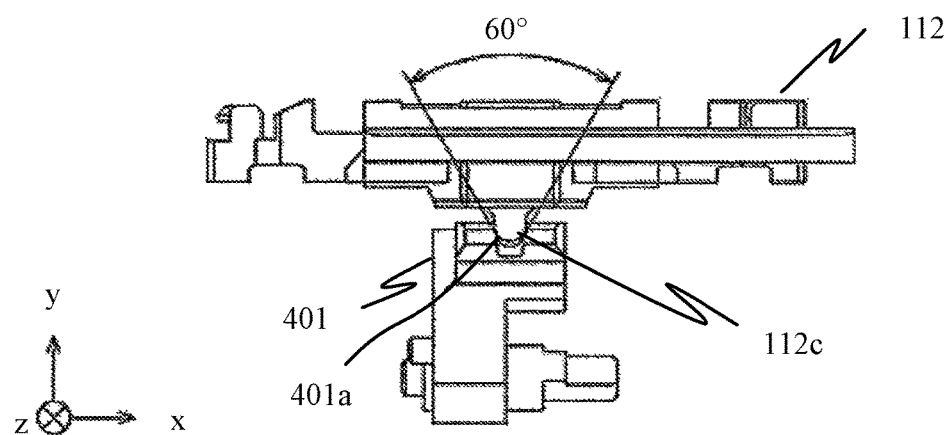

The motor unit 1000B according to this example is served as part of a lens driving unit to drive a lens unit along the optical axis. FIGS. 18B and 18B are explanatory diagrams of a coupling part of the motor unit 1000B and the lens unit. As with the first example, by rotational force in the direction of the arrow R in FIG. 11B, a spherical interlocking part 112c provided on the moving part outer frame 112 engages an interlocking groove 401a that is formed on an interlocking member 401 provided on the lens unit and has an opening angle of 60 degrees. Accordingly, the driving force from the motor unit 1000B is transmitted to the interlocking member 401 through the moving member outer frame 112. Moreover, as the same driving force in the direction of the arrow R illustrated in FIG. 11B in the first example is received by the guide member 113 through the moving member 114, which is integrated with the moving member outer frame 112, and the rolling balls 119x, 119y and 119z, unnecessary force is not transmitted to the vibrator holding frame 108.

Third Example

Figure 19A:
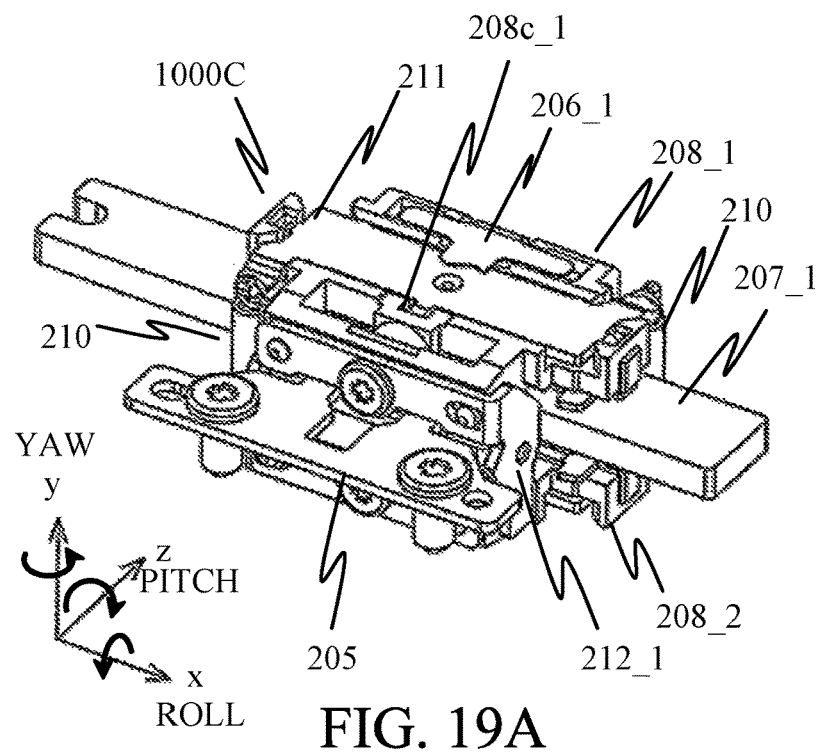
FIGS. 19A and 19B are perspective views of a vibration-wave motor unit according to a third example.
Figure 19B:
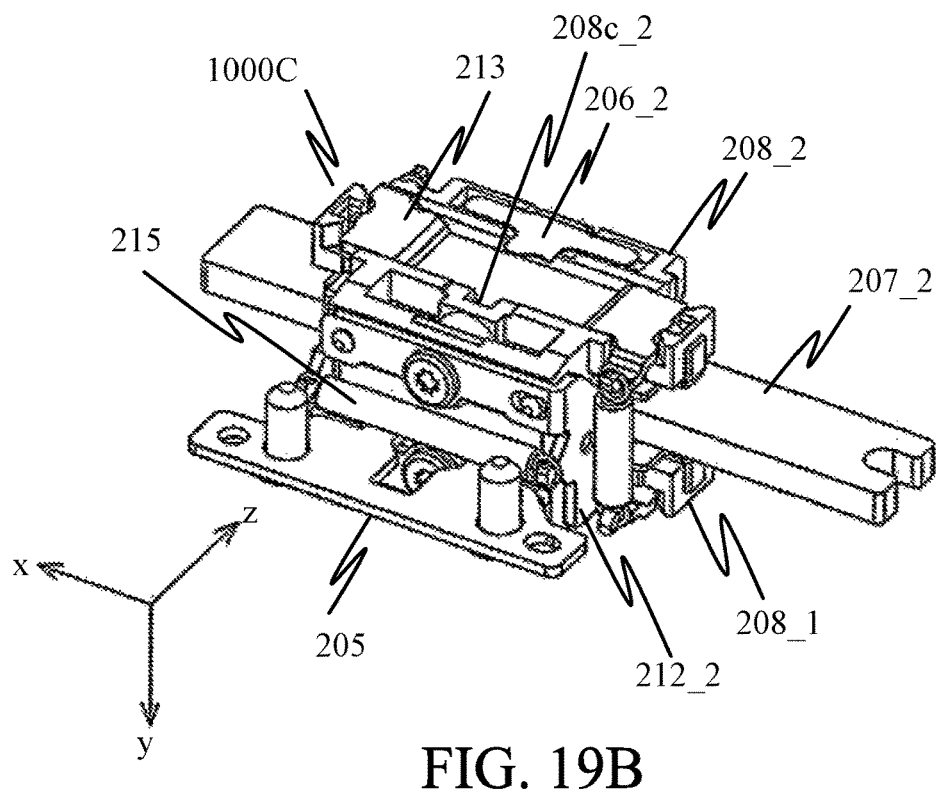
Figure 20:
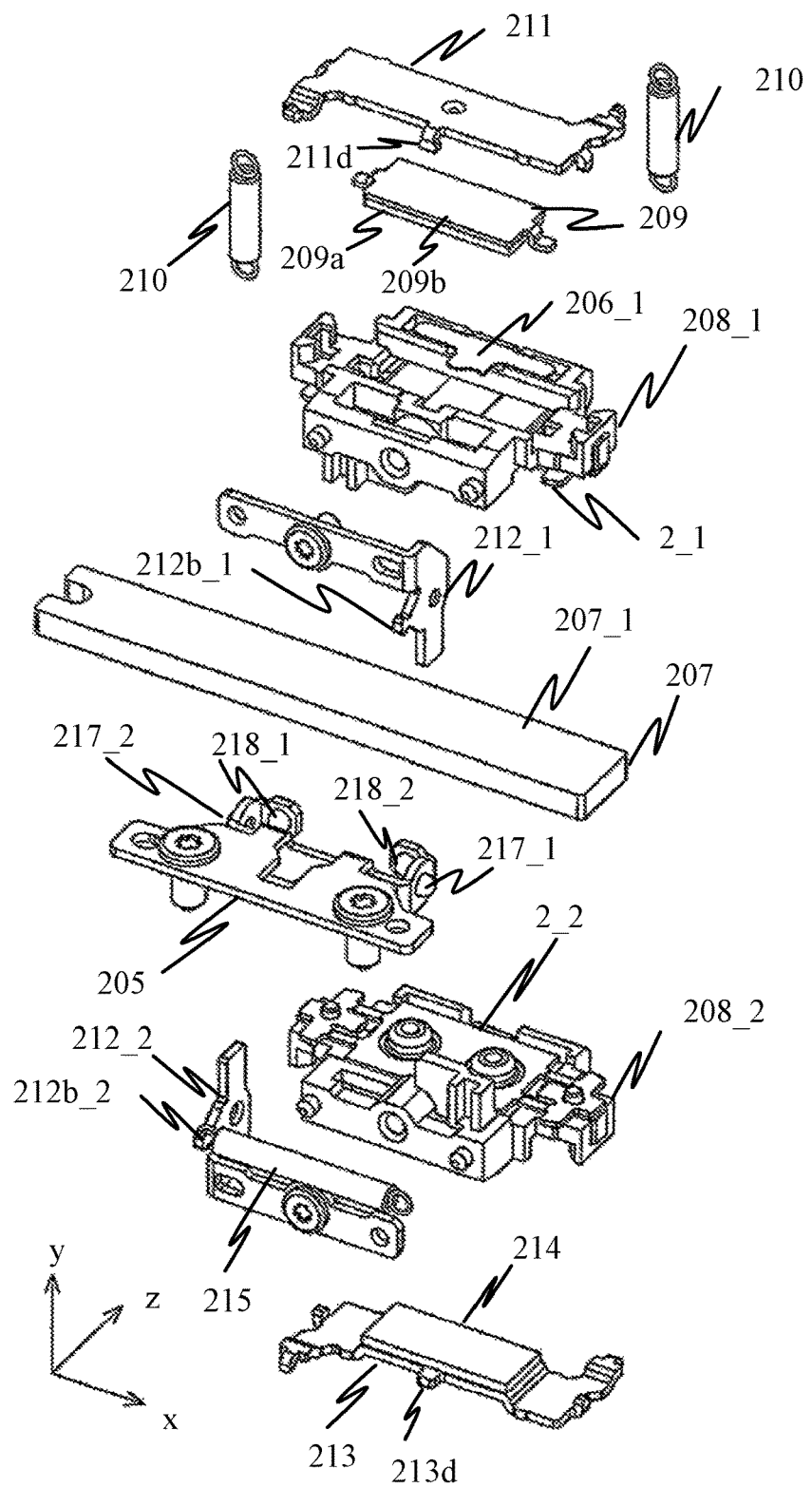
FIG. 20 is an exploded perspective view of the vibration-wave motor unit according to the third example.
Figure 21A:
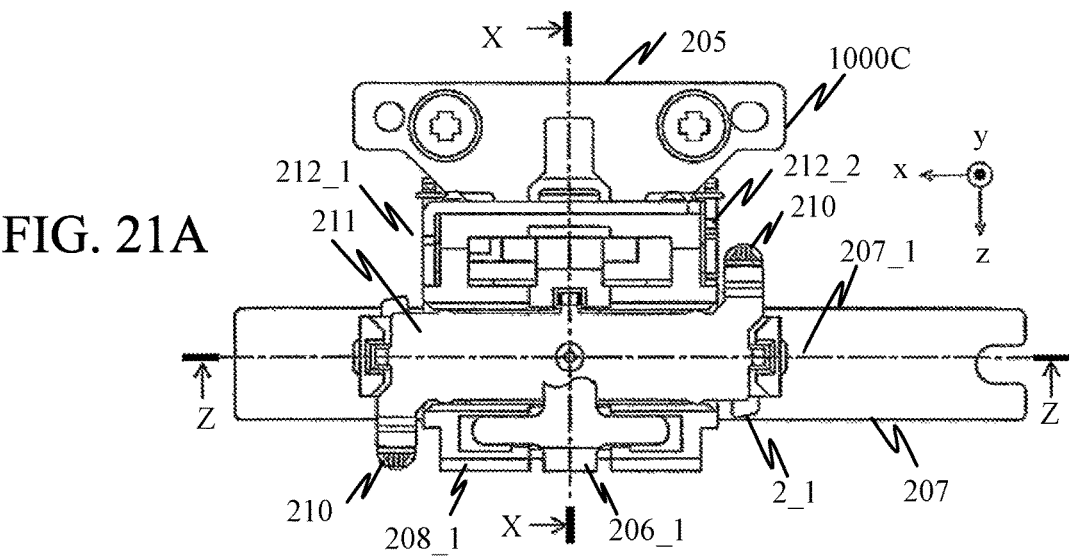
FIGS. 21A to 21C are a plan view and sectional views of the vibration-wave motor unit according to the third example.
Figure 21B:
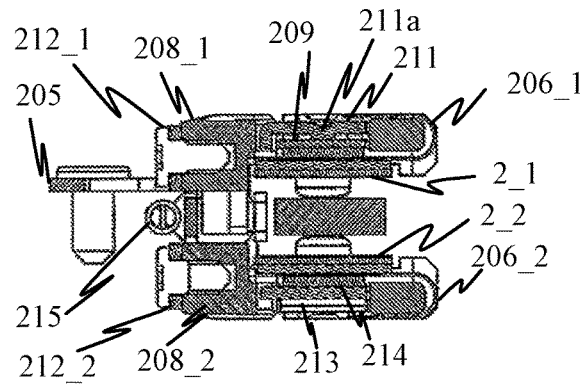
Figure 21C:
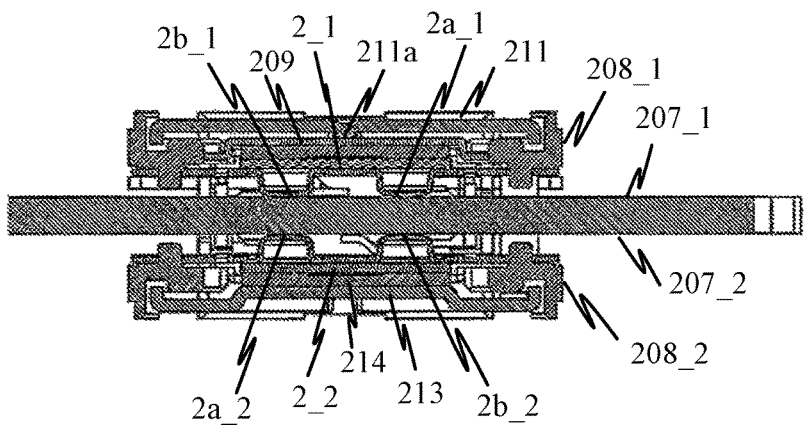

Referring to FIGS. 19A, 19B, 20, and 21A to 21C, a description will be given of a configuration of a vibration-wave motor unit (an ultrasonic motor unit, hereinafter, referred to as "motor unit") 1000C according to this example. FIGS. 19A and 19B are perspective views of the motor unit 1000C. FIG. 19A is a perspective view as seen form a top side, and FIG. 19B is a perspective view as seen from a bottom side. FIG. 20 is an exploded perspective view of the motor unit 1000C. FIGS. 21A to 21C are a plan view and sectional views of the motor unit 1000C. FIG. 21A is a plan view, and FIGS. 21B and 21C are sectional views taken along an x-x line and a z-z line of FIG. 21A, respectively.

The motor unit 1000C according to this example includes a first vibrator 2_1 and a second vibrator 2_2. The first and second vibrators 2_1 and 2_2 each are the same as the vibrator 2 in the first and second examples. The first and second vibrators 2_1 and 2_2 sandwiches a friction member 207. Driving protrusions 2a_1 and 2b_2 of the first vibrator 2_1 abut against a first abutment surface 207_1 on a first vibrator 2_1 side of the friction member 207. Driving protrusions 2a_2 and 2b_2 of the second vibrator 2_2 abut against a second abutment surface 207_2 on a second vibrator 2_2 side of the friction member 207.

A base member 205 is fixed to a fixing member (not illustrated) by the screws. Flexible substrates 206_1 and 206_2 are mechanically and electrically connected to the first and second vibrators 2_1 and 2_2, respectively, to vibrate the first and second vibrators 2_1 and 2_2. A first vibrator holding frame 208_1 is integrated with the first vibrator 2_1 by fixing fixed arm parts of the first vibrators 2_1 with the adhesive, and a second vibrator holding frame 208_2 is integrated with the second vibrator 2_2 by fixing fixed arm parts of the second vibrator 2_2 with the adhesive. A pressing intermediary member 209 includes a felt 209a that contacts the first vibrator 2_1, and a high rigid plate 209b, such as the metal, that receives pressing force of tension coil springs 210. The felt 209a transmits the pressing force of the tension coil springs 210 to the first vibrator 2_1 without preventing the vibrations energized in the first vibrator 2_1. The two tension coil springs (biasing members) 210 are disposed around the first and second vibrators 2_1 and 2_2, and, as described above, generate the pressing force as pressers in this example. A first pressing plate (first pressing member) 211 is biased by the tension coil springs 210. The first pressing plate 211 also includes a spherical protrusion (pressing part) 211a that abuts against the pressing intermediately member 209 on an intersection line of a front/rear symmetric plane C and a left/right symmetric plane D of the first vibrator 2_1.

A first coupling sheet metal 212_1 and a second coupling sheet metal 212_2 are respectively fixed to the first and second vibrator holding frames 208_1 and 208_2 by the screws. A second pressing plate (second pressing member) 213 is biased by the tension coil springs 210. A felt 214 transmits the pressing force of the tension coil springs 210 to the second vibrator 2_2 without preventing the vibrations energized in the second vibrator 2_2. An integrated spring 215 is a tension coil spring that are hooked between a hook part 212b_1 provided on the first coupling sheet metal 212_1 and a hook part 212b_2 provided on the second coupling sheet metal 212_2. The integrated spring 215 biases the first and second vibrator holding frames 208_1 and 208_2 through the first and second coupling sheet metals 212_1 and 212_2. The first and second vibrator holding frames 208_1 and 208_2, which are biased by the integrated spring 215, are integrated with the base member 205 in the x-axis direction.

In this example, a moving part, which includes each vibrator, each vibrator holding frame, the pressing intermediary member 209, the tension coil springs 210, each pressing plate, each coupling sheet metal, and the felt 214, relatively moves along the x-axis with respect to the friction member 207. The first vibrator 2_1, the first vibrator holding frame 208_1, and the first coupling sheet metal 212_1 are identical with the second vibrator 2_2, the second vibrator holding frame 208_2, and the second coupling sheet metal 212_2, respectively.

Figure 22A:
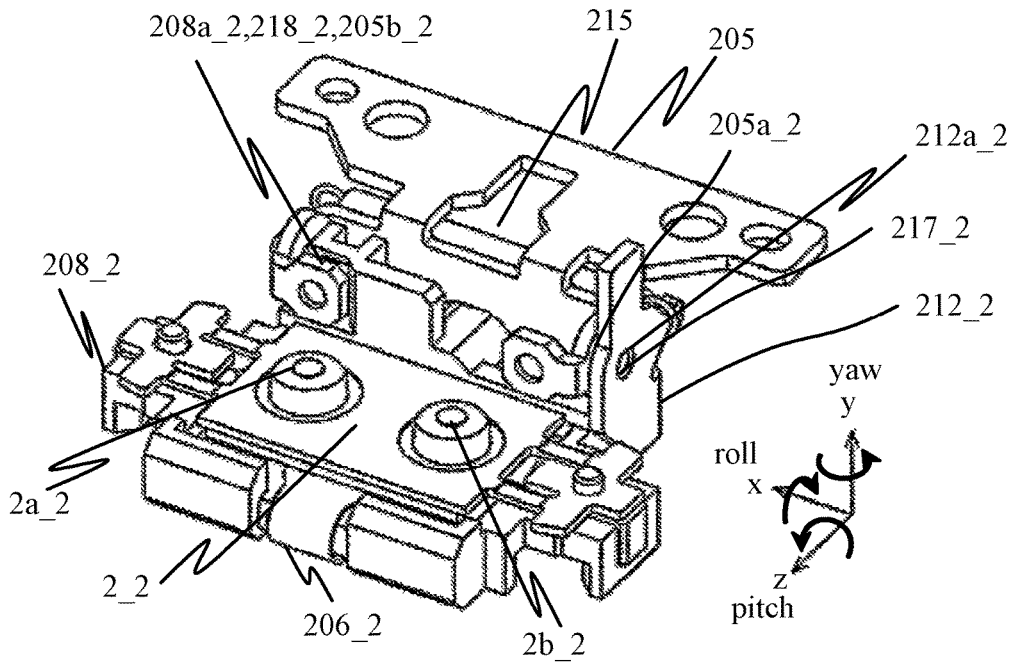
FIGS. 22A to 22C are explanatory diagrams of a degree of freedom of a vibrator according to the third example.
Figures 22B, 22C:
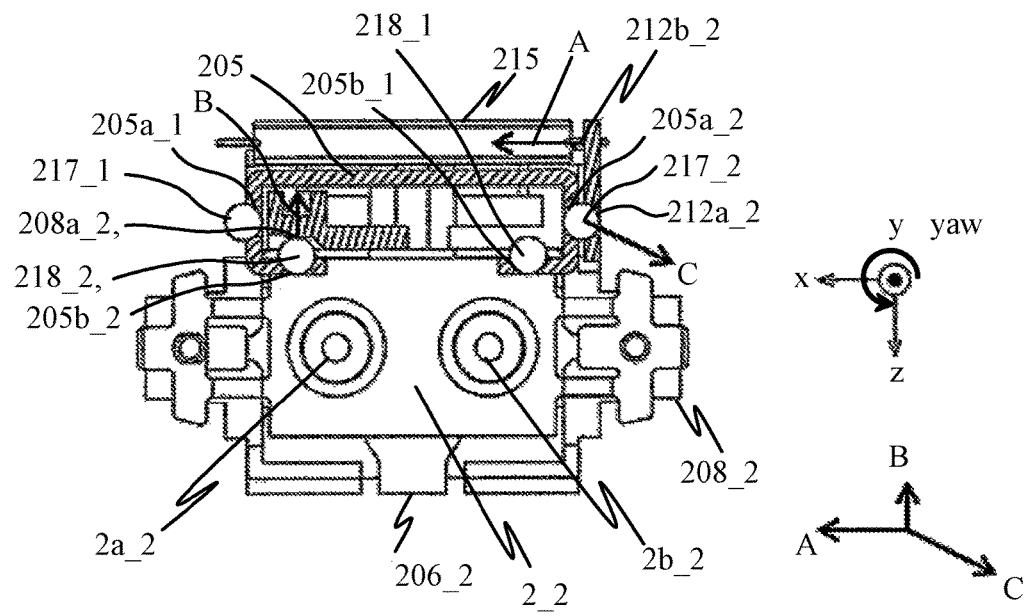

Next, a description will be given of a degree of freedom in motion of the first and second vibrators 2_1 and 2_2 according to this example. FIGS. 22A and 22B are explanatory diagrams of the second vibrator 2_2. In FIGS. 22A and 22B, components of the motor unit 1000C unnecessary for the explanation are omitted.

FIG. 22A illustrates the second vibrator holding member 208_2 and the base member 205 that are integrated by the integrated spring 215 through the second coupling sheet metal 212_2. A reference ball 217_2 is sandwiched between a conical hole part 212a_2 formed on the second coupling sheet metal 212_2 and a conical hole part 205a_2 formed on the base member 205. A ball 218_2 is sandwiched between a plane part 208a_2 of the second vibrator holding frame 208_2 and a conical hole part 205b_2 formed on the base member 205. Sandwiching the ball 218_2 between the plane part 208b_2 and the conical hole part 205c_2 restricts the rotation of the second vibrator holding frame 208_2 around the reference ball 217_2 with respect to the base member 205.

FIG. 22B illustrates a sectional view of the motor unit 1000C cut on a plane containing a setting center of the integrated spring 215, the reference ball 217_2, and the ball 218_2. Arrows A to C each represent force acting on the second vibrator holding frame 208_2. The force represented by the arrow A is force for biasing the second vibrator holding frame 208_2 by the integrated spring 215 to rotate the second vibrator holding frame 208_2 in the rotational direction (yaw direction) around the y-axis centering the reference ball 217_2. The force represented by the arrow B is a force for acting on the second vibrator holding frame 208_2 by the ball 218_2. As described above, sandwiching the ball 218_2 between the plane part 208b_2 and the conical hole part 205c_2 restricts the rotation of the second vibrator holding frame 208_2 around the reference ball 217_2 with respect to the base member 205. Thus, the rotation of the second vibrator holding frame 208_2 in the yaw direction is restricted. Then, moments of the forces A and B around the reference ball 217_2 balances.

The force C is force for acting on the second vibrator holding frame 208_2 through the second coupling sheet metal 212_2, balancing with resultant force of the forces A and B as illustrated in FIG. 22C. Thus, the degree of freedom in motion in the x-axis direction (x-axis translation direction) and the z-axis direction (z-axis translation direction) of the second vibrator holding frame 208_2 is restricted. Moreover, as the reference ball 217_2 is sandwiched between the conical hole part 212a_2 and the conical hole part 205a_2, the degree of freedom in motion in the y-axis direction (y-axis translation direction) of the second vibrator holding frame 208_2 is also restricted.

As described above, in this example, the motion of the second vibrator holding frame 208_2, which is integrated with the second vibrator 2_2, with respect to the base member 205 has two degrees of freedom in a rotational direction (roll direction) around the x-axis and a rotational direction (pitch direction) around the z-axis. In this example, as the second vibrator 2_2 has the two degrees of freedom in motion in the roll direction and in the pitch direction, the driving protrusions 2a_2 and 2b_2 of the second vibrator 2_2 can abut against the second abutment surface 207_2 of the friction member 207 certainly. Additionally, the forces A to C, which restrict the degree of freedom in motion of the second vibrator 2_2, balance within one plane, thus not generating unbalance of unnecessary force to the driving protrusions 2a_2 and 2b_2. The rotation of the second vibrator holding frame 208_2 around the reference ball 217_2 with respect to the base member 205 is identical with the rotation of the vibrator holding frame 8 in the roll direction and the pitch direction around the reference ball 17 illustrated in FIGS. 6D and 6E of the first example.

Though not being illustrated in FIGS. 22A and 22B, the first vibrator 2_1, the first vibrator holding frame 208_1, and the first coupling sheet metal 212_1 are arranged at a position where the second vibrator 2_2, the second vibrator holding frame 208_2, and the second coupling sheet metal 212_2 are rotated by 180 degrees around the z-axis. The reference ball 217_1 is sandwiched between a conical hole part formed on the first coupling sheet metal 212_1 and a conical hole part 205a_1 formed on the base member 205. The ball 218_1 is also sandwiched between a plane part 208a_1 of the first vibrator holding frame 208_1 and a conical hole part 205b_1 formed on the base member 205. Further, the reference balls 217_1 and 217_2 are disposed on the same sectional view illustrated in FIG. 22B. Thus, in this example, the degree of freedom of the first vibrator holding frame 208_1, which is integrated with the first vibrator 2_1, with respect to the base member 205 has two degree of freedom in the roll direction and the pitch direction. In this example, as the first vibrator 2_1 has the degree of freedom in motion in the roll direction and in the pitch direction, the driving protrusions 2a_1 and 2b 1 of the first vibrator 2_1 can abut against the first abutment surface 207_1 of the friction member 207 certainly.

In this example, driving the first and second vibrators 2_1 and 2_2, which sandwich the friction member 207, at the same time can generate larger thrust force compared with case of driving one vibrator. Increasing the biasing force of the integrated spring 215 according to the generated thrust force is necessary, but using the tension coil spring as the integrated spring 215 can save a space and can make the degree of freedom for setting the biasing force larger compared with the plate spring. As each pressing force of the tension coil springs 210, by which each vibrator abuts against the friction member 207, also balances across the friction member 207, the straight guide part explained in the first and second examples to smoothly guide the motion while receiving the pressing force is unnecessary in this example.

Figure 23:
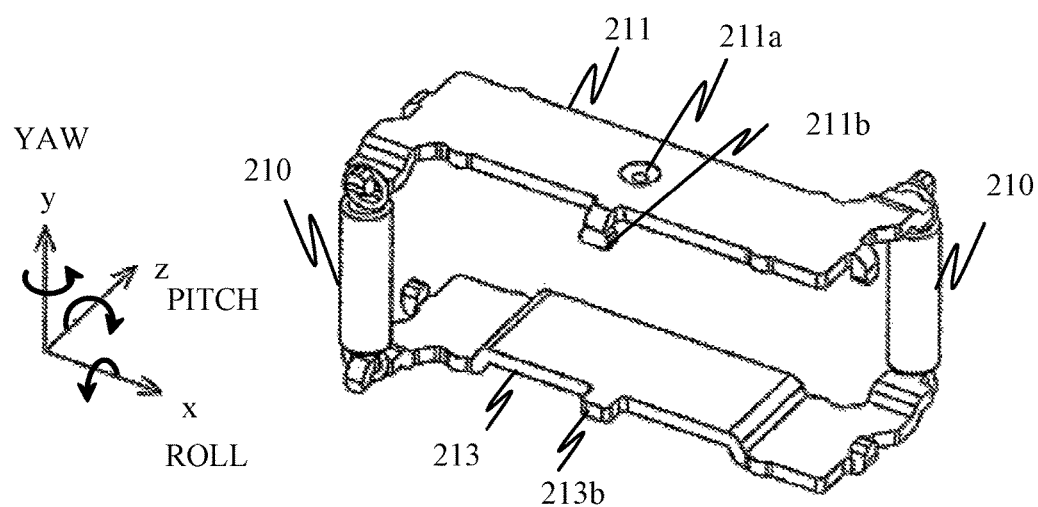
FIG. 23 is an explanatory diagram of a relation between a first pressing plate and a second pressing plate according to the third example.

FIG. 23 is an explanatory diagram of a relation between the first and second pressing plates 211 and 213. The two tension coil springs 210 engage each hook part of the first and second pressing plates 211 and 213. As a distance in the y-axis direction between the first and second pressing plates 211 and 213 is determined by unillustrated components of the motor unit 1000C, the two tension coil springs 210 bias the first and second pressing plates 211 and 213. The two tension coil springs 210 each are disposed at the position diagonal to each other with respect to the spherical protrusion 211a and have the same specification. However, biasing force of each tension coil spring at a predetermined length is not necessarily the same due to production tolerance, and error in a position of each spring hook part of the first and second pressing plates 211 and 213 is also caused due to production precision in a single part and production error of intervening parts. In this example, the first pressing plate 211 is abutted against the pressing intermediary member 209 by the spherical protrusion 211a, and has the degree of freedom in motion (tilt) in the roll direction and the pitch direction with the spherical protrusion 211a as a fulcrum. In other words, the first pressing part 211 can tilt around the axis orthogonal to the front/rear symmetric plane C in the left/right symmetric plane D and around the axis orthogonal to the left/right symmetric plane D in the front/rear symmetric plane C. The first pressing part need not be strictly tiltable around each axis, and is regarded to be tiltable around each axis even when shifting by a few mm from each axis. For example, although being different according to performance and a use, shifts may be about ±0.2 mm. Accordingly, the pressing force of the two tension coil springs 210 acting on the driving protrusions 2a_1 and 2b_1 from the spherical protrusion 211a through the pressing intermediary member 209 each are adjusted optimally with respect to the production tolerance. As the second vibrator 2_2 also receives the reaction force from the second pressing plate 213, the optimally adjusted processing force is applied to the driving protrusions 2a_2 and 2b_2.

Moreover, the first pressing plate 211 relatively has the degree of freedom in motion in the roll direction and the pitch direction with respect to the first and second vibrator holding frames 208_1 and 208_2. Thus, regardless of a tilt of the first and second vibrator holding frames 208_1 and 208_2 and a change of the tilt, an attitude of the first pressing plate 211 is adjusted to be an optimum state and the pressing force of each of the two tension coil springs 210 becomes stable without variations.

A protrusion 211b provided on the first pressing plate 211 engages a groove 208c_1 formed on the first vibrator holding frame 208_1 illustrated in FIG. 19A. A protrusion 213b provided on the second processing plate 213 also engages a groove 208c_2 formed on the second vibrator holding frame 208_2 illustrated in FIG. 19B. Thus, the first and second pressing plates 211 and 213 are integrated in the x-axis direction through the first and second vibrator holding frames 208_1 and 208_2. Accordingly, a positional relation among the tension coil springs 210, the first pressing plate 211 and the second pressing plate 213 is not changed while the moving part moves along the x-axis, and the pressing force of the tension coil springs 210 becomes stable.

Figure 24A:
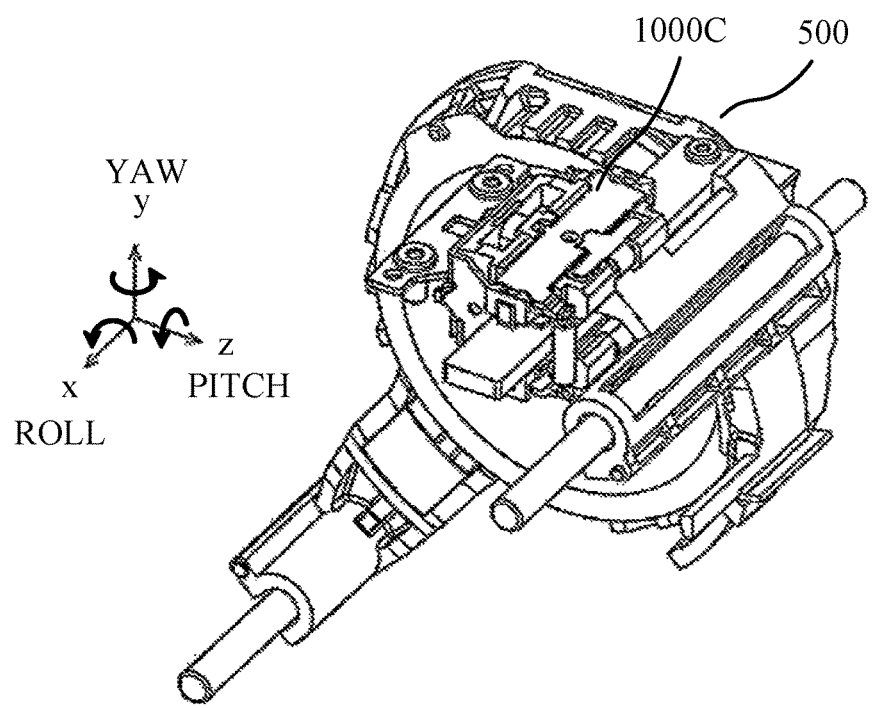
FIGS. 24A and 24B are perspective views of a lens driving unit according to the third example.
Figure 24B:
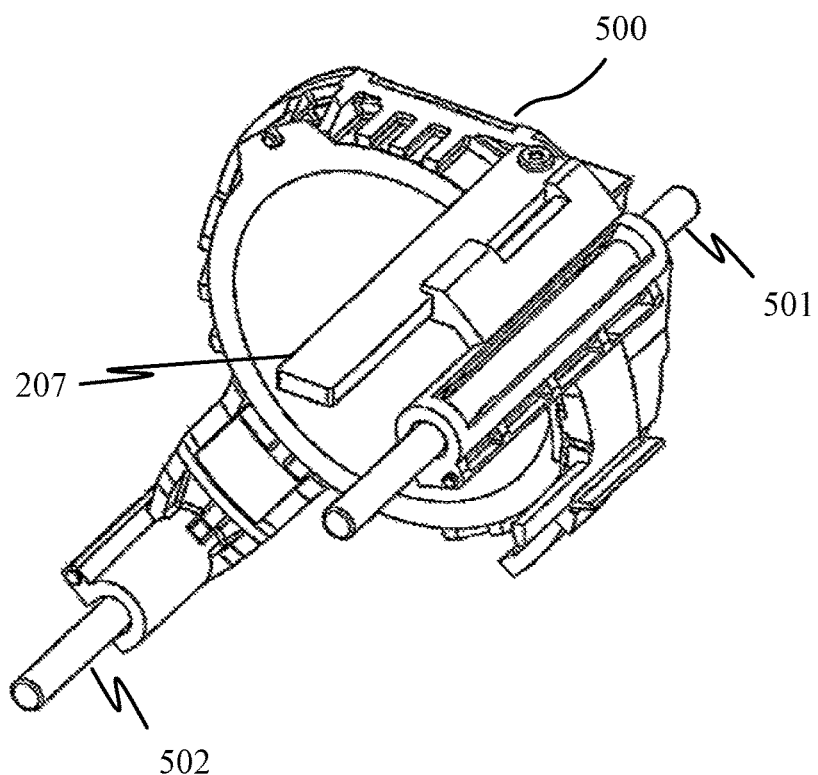

FIGS. 24A and 24B are perspective views of a lens driving unit. FIG. 24A illustrates the lens driving unit to which the motor unit 1000C is attached. FIG. 24B illustrates the lens driving unit to which the motor unit 1000C is not attached. A lens unit 500 is supported to be movable along the optical axis (x-axis) by a configuration of a bar and a sleeve. Guide bars 501 and 502 are formed to be parallel to the x-axis, being supported by an unillustrated member. The friction member 207 provided on the motor unit 1000C is integrated with the lens unit 500 by the screws and with the adhesive, allowing thrust force to move in the optical axis direction to act the lens unit 500.

The number of the tension coil springs 110 is four in the first and second examples, and is two in the third example, but may be other numbers. Moreover, in the third example, an engagement relation between the first and second pressing plates 211 and 213 may be switched in a height direction, and a compression coil spring may be used as the pressers instead of the tension coil spring.

Furthermore, an expression "each member exists in a plane" in each example may be interpreted that at least part of the member intersects the surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091507, filed on Apr. 28, 2016, which is hereby incorporated by reference herein in its entirety.

What is claimed is:

1. A motor comprising:
a first vibrator;
a contacting member;
a plurality of biasing parts that are arranged to press the first vibrator onto the contacting member in contact with the first vibrator;
a first pressing member that is biased by the plurality of biasing parts and that includes a pressing part arranged to press the first vibrator by the biasing force of the plurality of biasing parts; and
a second pressing member that is biased by the plurality of biasing parts,
wherein the first vibrator and the contacting member are arranged to move relatively by vibrations that occur in the first vibrator,
wherein the first and second pressing members are arranged to move integrally with the first vibrator while the first vibrator moves, and
wherein the first pressing member and the first vibrator are arranged to be tiltable around a first direction orthogonal to both of a moving direction of the first vibrator and a biasing direction of the plurality of biasing parts.

2. The motor according to claim 1, wherein the pressing part is disposed in a plane of a first surface that is parallel to both of the first direction and the biasing direction and that symmetrically divides a facing area of the first vibrator facing the contacting member.

3. The motor according to claim 2, wherein the first pressing member is arranged to be tiltable around a straight line that is orthogonal to a second surface, which is parallel to both of the moving direction and the biasing direction and symmetrically divides the facing area, and that is positioned in the plane of the first surface.

4. The motor according to claim 3,
wherein the pressing part is disposed in a plane of the second surface, and
wherein the first pressing member is arranged to be tiltable around a straight line that is orthogonal to the first surface and that is positioned in the plane of the second surface.

5. The motor according to claim 1, further comprising a second vibrator contacting the contacting member on a rear side of a surface where the first vibrator contacts the contacting member,
wherein the second pressing member is arranged to press the second vibrator onto the contacting member by the biasing force of the plurality of biasing parts.

6. The motor according to claim 1, wherein the plurality of biasing parts are each a coil spring.

7. The motor according to claim 1, wherein the plurality of biasing parts are each a tension coil spring.

8. The motor according to claim 1, wherein the first vibrator includes two driving protrusions that abut against the contacting member.

9. The motor according to claim 1, wherein the first vibrator includes a vibration plate that contacts the contacting member, and a piezoelectric element that is arranged to excite vibration by being applied with a voltage.

10. An apparatus comprising:
a motor; and
a member that drives by driving force from the motor,
wherein the motor includes:
a first vibrator;
a contacting member;
a plurality of biasing parts that are arranged to press the first vibrator onto the contacting member in contact with the first vibrator;
a first pressing member that is biased by the plurality of biasing parts and that includes a pressing part arranged to press the first vibrator by the biasing force of the plurality of biasing parts; and
a second pressing member that is biased by the plurality of biasing parts,
wherein the first vibrator and the contacting member are arranged to move relatively by vibrations that occur in the first vibrator,
wherein the first and second pressing members are arranged to move integrally with the first vibrator while the first vibrator moves, and
wherein the first pressing member and the first vibrator are arranged to be tiltable around a first direction orthogonal to both of a moving direction of the first vibrator and a biasing direction of the plurality of biasing parts.

11. The apparatus according to claim 10, wherein the apparatus is an optical apparatus including a lens.

12. The motor according to claim 1, wherein the plurality of biasing parts are disposed around the first vibrator.

13. The apparatus according to claim 10, wherein the plurality of biasing parts are disposed around the first vibrator.

14. A motor comprising:
a first vibrator;
a contacting member;
a plurality of biasing parts that are arranged to press the first vibrator onto the contacting member in contact with the first vibrator;
a first pressing member that is biased by the plurality of biasing parts and that is arranged to press the first vibrator by the biasing force of the plurality of biasing parts; and
a second pressing member that is biased by the plurality of biasing parts,
wherein the first vibrator and the contacting member are arranged to move relatively by vibrations that occur in the first vibrator, and
wherein the first vibrator is arranged to be tiltable around a first direction orthogonal to both of a moving direction of the first vibrator and a biasing direction of the plurality of biasing parts.

15. The motor according to claim 14, wherein the first pressing member includes a pressing part arranged to press the first vibrator by the biasing force of the plurality of biasing parts.

16. The motor according to claim 14, wherein the first and second pressing members are arranged to move integrally with the first vibrator while the first vibrator moves.

17. The motor according to claim 14, wherein the first pressing member and the first vibrator are arranged to be tiltable around the first direction.

18. The motor according to claim 15, wherein the pressing part is disposed in a plane of a first surface that is parallel to both of the first direction and the biasing direction and that symmetrically divides a facing area of the first vibrator facing the contacting member.

19. The motor according to claim 18, wherein the first pressing member is arranged to be tiltable around a straight line that is orthogonal to a second surface, which is parallel to both of the moving direction and the biasing direction and symmetrically divides the facing area, and that is positioned in the plane of the first surface.

20. The motor according to claim 19,
wherein the pressing part is disposed in a plane of the second surface, and
wherein the first pressing member is arranged to be tiltable around a straight line that is orthogonal to the first surface and that is positioned in the plane of the second surface.

21. The motor according to claim 14, further comprising a second vibrator contacting the contacting member on a rear side of a surface where the first vibrator contacts the contacting member,
wherein the second pressing member is arranged to press the second vibrator onto the contacting member by the biasing force of the plurality of biasing parts.

22. The motor according to claim 14, wherein the plurality of biasing parts are each a coil spring.

23. The motor according to claim 14, wherein the plurality of biasing parts are each a tension coil spring.

24. The motor according to claim 14, wherein the first vibrator includes two driving protrusions that abut against the contacting member.

25. The motor according to claim 14, wherein the first vibrator includes a vibration plate that contacts the contacting member, and a piezoelectric element that is arranged to excite vibration by being applied with a voltage.

26. An apparatus comprising:
a motor; and
a member that drives by driving force from the motor,
wherein the motor includes:
a first vibrator;
a contacting member;
a plurality of biasing parts that are arranged to press the first vibrator onto the contacting member in contact with the first vibrator;
a first pressing member that is biased by the plurality of biasing parts and that is arranged to press the first vibrator by the biasing force of the plurality of biasing parts; and
a second pressing member that is biased by the plurality of biasing parts,
wherein the first vibrator and the contacting member are arranged to move relatively by vibrations that occur in the first vibrator, and
wherein the first vibrator is arranged to be tiltable around a first direction orthogonal to both of a moving direction of the first vibrator and a biasing direction of the plurality of biasing parts.

27. The apparatus according to claim 26, wherein the apparatus is an optical apparatus including a lens.

28. The motor according to claim 14, wherein the plurality of biasing parts are disposed around the first vibrator.

29. The apparatus according to claim 26, wherein the plurality of biasing parts are disposed around the first vibrator.

* * * * *